(12) United States Patent
Leek et al.

(10) Patent No.: US 7,207,150 B2
(45) Date of Patent: Apr. 24, 2007

(54) DECK BOARD TIE CONNECTOR, CONNECTION AND METHOD

(75) Inventors: William F. Leek, Carmel, CA (US); Charles-Henri Mathis, La Rochelle (FR)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 347 days.

(21) Appl. No.: 10/461,547

(22) Filed: Jun. 12, 2003

(65) Prior Publication Data
US 2004/0250505 A1 Dec. 16, 2004

(51) Int. Cl.
*E04B 5/52* (2006.01)
(52) U.S. Cl. ............... 52/747.1; 52/480; 52/509; 52/586.1; 52/650.3; 33/526; 411/457
(58) Field of Classification Search ............... 52/127.6, 52/480, 489.1, 489.2, 715, 403.1, 586.1, 52/586.2, 591.5, 747.1, 747.11, 749.12, 650.3, 52/747.12, 698, 509; 33/526–527, 613; 29/238, 243.56; 411/920, 451.3, 457–459, 411/461, 456; 403/286, 232.1
See application file for complete search history.

(56) References Cited

U.S. PATENT DOCUMENTS

| | | | |
|---|---|---|---|
| 1,546,296 A | 7/1925 | Lundeen |
| 1,669,199 A | 5/1928 | Hicks |
| 1,879,457 A | 9/1932 | Paulsen |
| 1,914,257 A | 6/1933 | Holmes |
| 2,008,192 A | 7/1935 | Stubbs |
| 2,066,813 A | 1/1937 | Williams |
| 2,258,861 A | 10/1941 | Park et al. |
| 2,281,519 A | 4/1942 | Faber |
| 2,558,131 A | 6/1951 | Green |
| 2,612,813 A | 10/1952 | Cohn |
| 2,620,705 A | 12/1952 | Podvinecz et al. |
| 2,774,969 A | 12/1956 | Samples |
| 2,807,083 A | 9/1957 | Zilliacus et al. |
| 2,855,601 A | 10/1958 | Hamlin |
| 2,979,092 A | 4/1961 | Bradford |

(Continued)

FOREIGN PATENT DOCUMENTS

DE    201 12 018 U1    7/2002

(Continued)

OTHER PUBLICATIONS

Annon. How to Design & Build Decks & Patios. Ortho Books. San Francisco, 1979, pp. 42-43, 48-49, 60-61, 64-66, 107.

(Continued)

*Primary Examiner*—Winnie Yip
(74) *Attorney, Agent, or Firm*—Law Offices of James R. Cypher

(57) ABSTRACT

A method of forming a connection, and a connector, that attaches supported members, such as deck boards, to supporting members, such as deck joists. In some forms, each connector attaches a single supported member. In others, the connector attaches two supported members. Many forms of the connector are possible, but all are narrow enough to fit between two supported members laid side-by-side, all are attached to the supported members by fasteners, and all are driven directly into the supporting members. The resulting structure is characterized by the apparent absence of nails or other fasteners.

36 Claims, 31 Drawing Sheets

U.S. PATENT DOCUMENTS

| | | | |
|---|---|---|---|
| 3,031,725 A | 5/1962 | Omholt | |
| 3,060,441 A | 10/1962 | Henning | |
| 3,110,467 A | 11/1963 | Dube | |
| 3,187,389 A | 6/1965 | Anderson | |
| 3,237,360 A | 3/1966 | Mills | |
| 3,331,180 A | 7/1967 | Vissing et al. | |
| 3,381,730 A | 5/1968 | Omholt | |
| 3,619,963 A | 11/1971 | Omholt | |
| 3,669,480 A | 6/1972 | Fugate | |
| 3,713,264 A | 1/1973 | Morgan, Jr. | |
| 3,945,293 A | 3/1976 | Krol | |
| 4,127,975 A | 12/1978 | Judkins | |
| 4,179,058 A | 12/1979 | Yost | |
| 4,213,374 A | 7/1980 | Hüsler | |
| 4,279,111 A | 7/1981 | Hacker | |
| 4,299,069 A | 11/1981 | Neumann | |
| 4,313,688 A | 2/1982 | Daniels | |
| 4,333,286 A | 6/1982 | Weinar | |
| 4,361,999 A | 12/1982 | Sidney | |
| 4,377,060 A | 3/1983 | Ragland | |
| 4,448,007 A | 5/1984 | Adams | |
| 4,587,788 A | 5/1986 | Bielicki | |
| 4,620,403 A | 11/1986 | Field | |
| 4,697,045 A * | 9/1987 | Beatty | 174/159 |
| 4,713,868 A | 12/1987 | Grabowski | |
| 4,714,372 A | 12/1987 | Commins | |
| 4,733,812 A | 3/1988 | Lewis et al. | |
| 4,779,393 A * | 10/1988 | Jong | 52/715 |
| 4,831,808 A | 5/1989 | Wynar | |
| 4,844,651 A | 7/1989 | Partridge | |
| 4,896,985 A | 1/1990 | Commins | |
| 4,903,882 A | 2/1990 | Long | |
| 4,925,141 A | 5/1990 | Classen | |
| 4,965,980 A | 10/1990 | Leavens | |
| 5,027,573 A | 7/1991 | Commins et al. | |
| 5,123,584 A | 6/1992 | Harrison | |
| 5,137,112 A * | 8/1992 | Nichols | 182/3 |
| 5,150,982 A | 9/1992 | Gilb | |
| 5,201,156 A | 4/1993 | Newman | |
| 5,671,580 A | 9/1997 | Chou | |
| 5,738,473 A | 4/1998 | Tebo | |
| 5,775,048 A | 7/1998 | Orchard | |
| 5,842,319 A * | 12/1998 | Ravetto | 52/715 |
| 5,846,019 A * | 12/1998 | Kuhns | 403/282 |
| 5,927,923 A | 7/1999 | Tebo | |
| 5,997,209 A | 12/1999 | Sachs | |
| 6,071,054 A | 6/2000 | Tebo | |
| D429,628 S * | 8/2000 | Peters | D8/390 |
| D450,568 S | 11/2001 | Sachs | |
| 6,314,699 B1 | 11/2001 | West | |
| 6,416,269 B1* | 7/2002 | Martel et al. | 411/461 |
| 6,470,641 B1* | 10/2002 | Faure | 52/480 |
| 6,484,467 B2 | 11/2002 | Crout | |
| 6,508,010 B2* | 1/2003 | Hanson et al. | 33/613 |
| 6,508,628 B2 | 1/2003 | Amr | |
| 6,651,398 B2* | 11/2003 | Gregori | 52/489.1 |
| 6,711,864 B2* | 3/2004 | Erwin | 52/582.1 |
| 6,792,733 B2 | 9/2004 | Wheeler et al. | |
| 6,810,633 B2 | 11/2004 | Harris, Sr. | |
| 6,880,306 B2 | 4/2005 | Burken et al. | |
| 7,021,021 B2 | 4/2006 | Saldana | |
| 2004/0237463 A1 | 12/2004 | Reif et al. | |

FOREIGN PATENT DOCUMENTS

| | | | |
|---|---|---|---|
| DE | 102 30 797 A1 | | 2/2003 |
| EP | 0 177 959 A1 | | 4/1986 |
| FR | 570843 | | 5/1924 |
| FR | 659272 | | 6/1929 |
| FR | 1197693 | | 12/1959 |
| GB | 2 172 078 A | | 9/1986 |
| GB | 2360337 | | 9/2001 |
| JP | 2002-206276 | * | 7/2002 |
| WO | WO 95/25856 A1 | | 9/1995 |
| WO | WO 03/009138 A2 | | 1/2003 |

OTHER PUBLICATIONS

Annon. Redwood Design-a-Deck Instruction Manual. California Redwood Association. Feb. 1985.

EbTy Invisible Deck Fastening System; Deckmaster Hidden Deck Fastening System. Rockler Woodworking and Hardware Professional Catalog, Spring 2003, p. 9.

Holbrook, D., "Hidden Deck Fasteners," The Journal of Light Construction. May 2001. pp. 73-79.

Tiger Claw Hidden Deck Fasteners. Product datasheet [online]. Tiger Claw Incorporated, 2003, retrieved on Sep. 24, 2003. Retrieved from the Internet: URL: www.deckfastener.com/products.htm.

Kant-Sag DC-50 Deck Clips. Home Improvement Center Product Catalog. Oct. 1991, p. 61.

"Igel" deck fastener. Product photographs [online]. Braun & Würfele GmbH & Co. 2002, retrieved on Oct. 17, 2002. URL: www.braun-wuerfele.de/aktuell/aktuell.php.

Derwent Acc. No. 2002-067985. "Double angle bracket for connecting wooden members to groung has upright flange with fixing nail spikes and foot plates with fastening openings." DE 20112018U1 Doppelwinkelplatte. 2002 ABSTRACT. Retrieved online from Delphion.com.

HNT Clips-Quick product photographs. HNT-GmbH. Received in the offices of James R. Cypher, May 6, 2003.

Letti-Klammer product data sheet and photograph. Patentband AS. Feb. 2000.

USV product data sheet for screws. Received in the offices of James R. Cypher, May 6, 2003.

DBTC Concealed Deck-Tie. Product data [online]. Simpson Strong-Tie Company, Inc. 2001. Retrieved on Feb. 6, 2001. Retrieved from the Internet: URL: www.strongtie.com/products/connectors_list/DBTC.html and www.strongtie.com/products/Whats_New.html.

Tebo™ by Soptnails. "The Fastest & Cleanest Way to a Better Deck!" Advertisement. Spotnails, Inc. Rolling Meadows, Illinois. The Journal of Light Construction. Jun. 2004, p. 112.

DeckOne. "Deck Fastening for the 21$^{st}$ Century." Product brochure. Deck One LLC, Redondo Beach, Calif. Received in the offices of James R. Cypher, May 4, 1999.

EB•TY Hidden Deck Fastening System. Advertisement. Blue Heron Enterprises, LLC. Califon, New Jersey. The Journal of Light Construction. May 1999. p. 110.

DBT1 Deck Board Tie. Product data. Simpson Strong-Tie Company, Inc. San Leandro, California. Apr. 1989.

DBT2 Deck Board Tie. Product data. Simpson Strong-Tie Company, Inc. San Leandro, California. Apr. 1989.

DT Deck Ties. KC Metals Catalog., KC Metal Products, Inc. San Jose, California. 1997/1998 p. 63.

"Fix Plancher Invisible." Burger International, France. Two photographs and drawing sheet with supporting declaration by Jürgen H. Wilhelmi executed Mar. 20, 2004.

"Nails—different types for different jobs." 2000-2004 diydata.com. Retrieved from the internet: URL http://www.diydata.com/materials/nails/nails/htm.

* cited by examiner

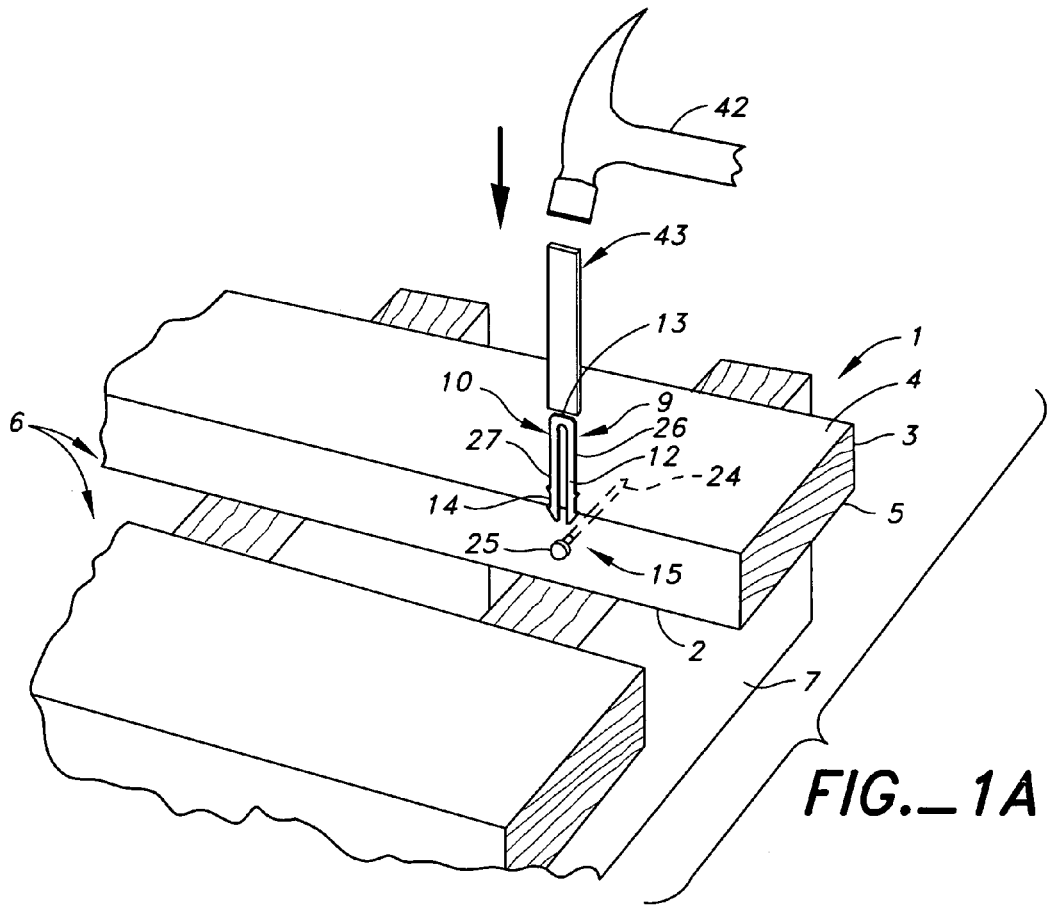
FIG._1A
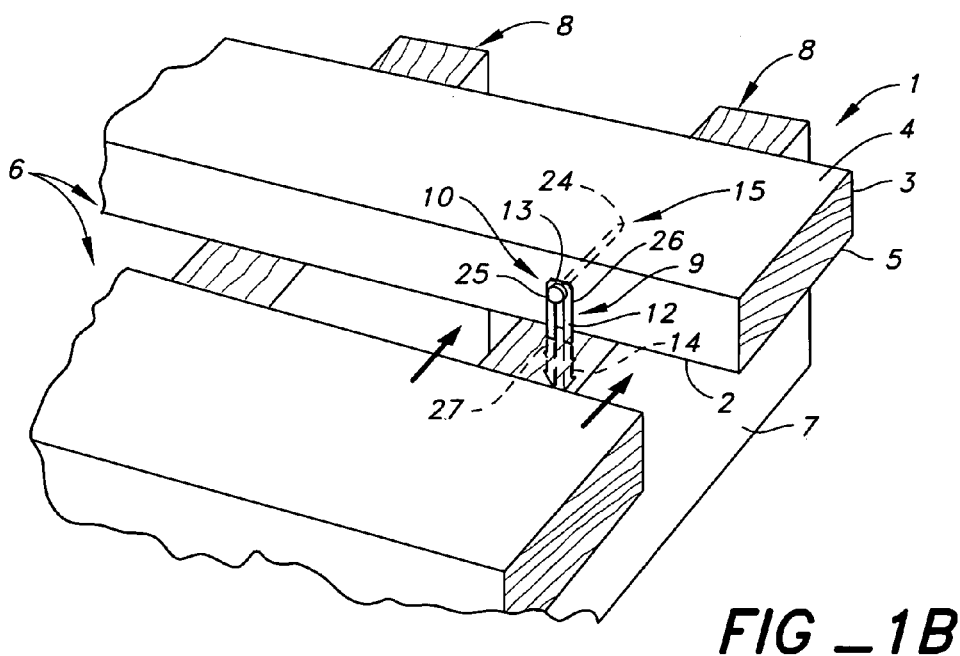
FIG _1B

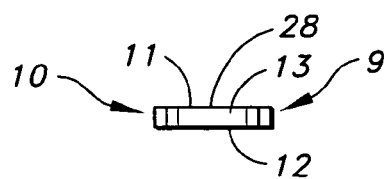
FIG._1C
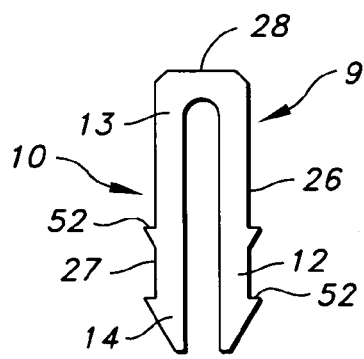
FIG._1D
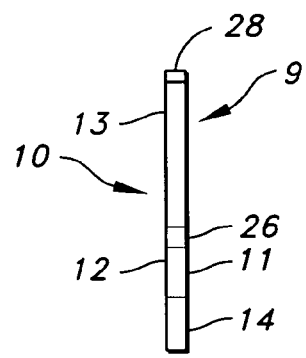
FIG._1E
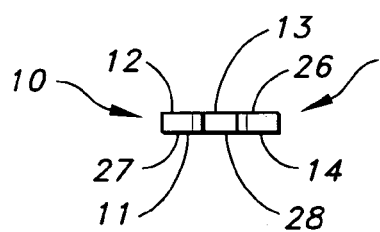
FIG._1F
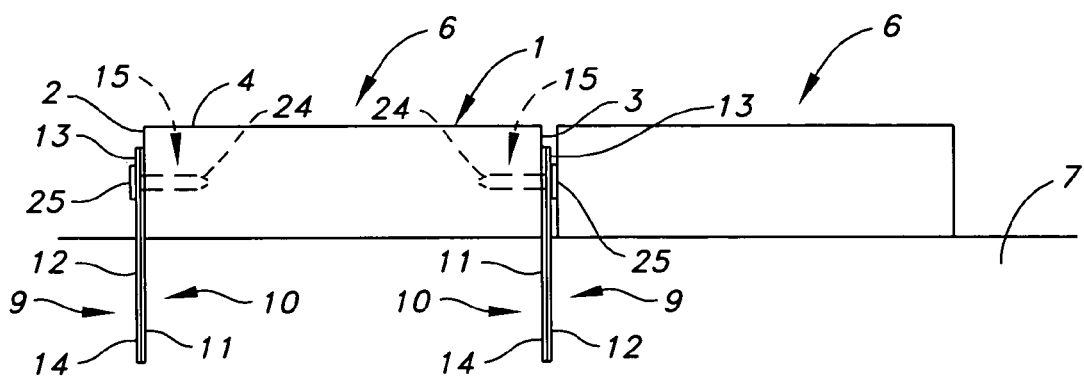
FIG _1G

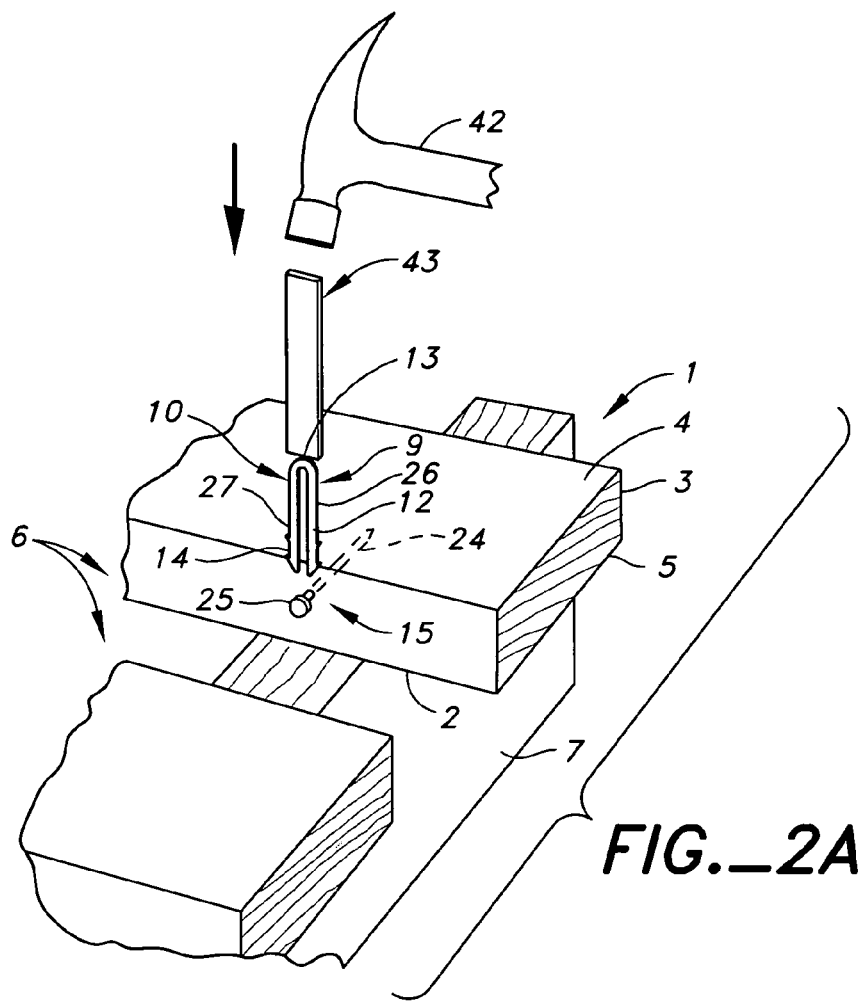
FIG._2A
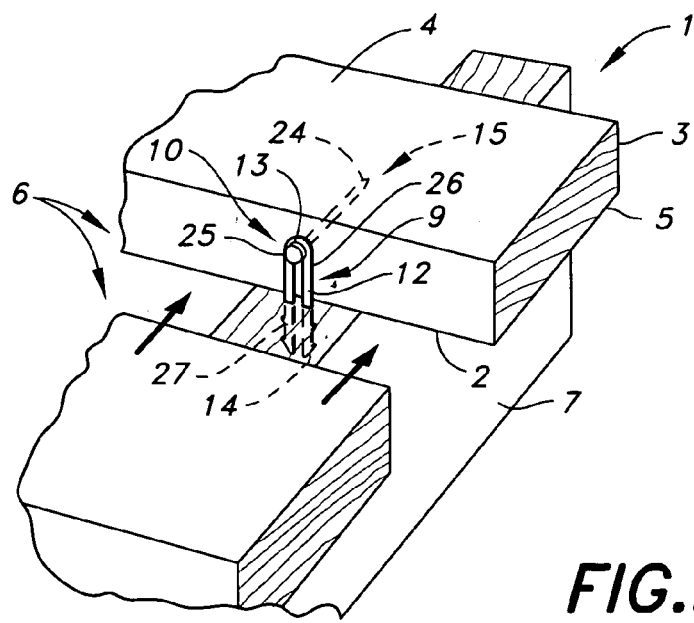
FIG._2B

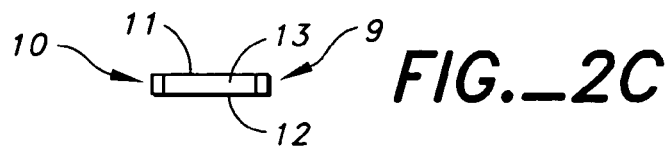
FIG._2C
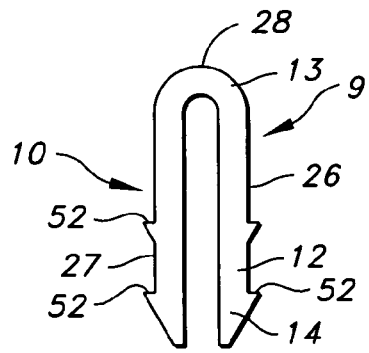
FIG._2D
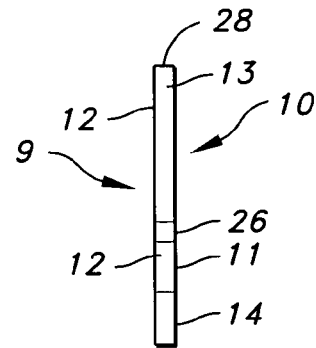
FIG._2E
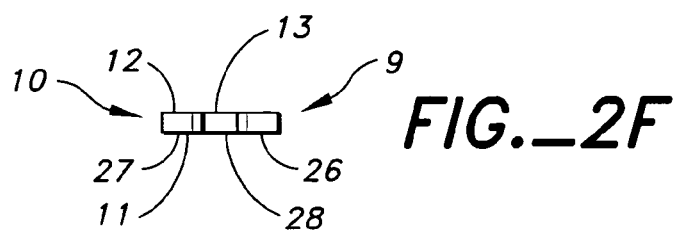
FIG._2F
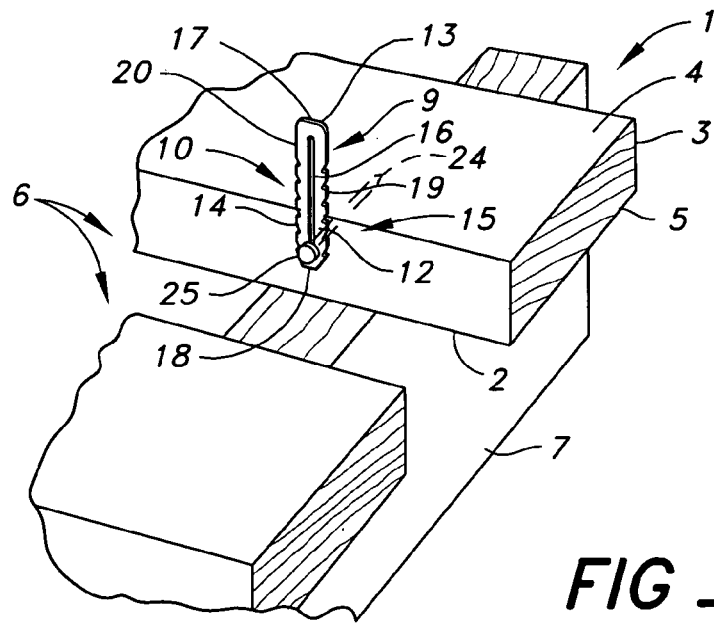
FIG _3A

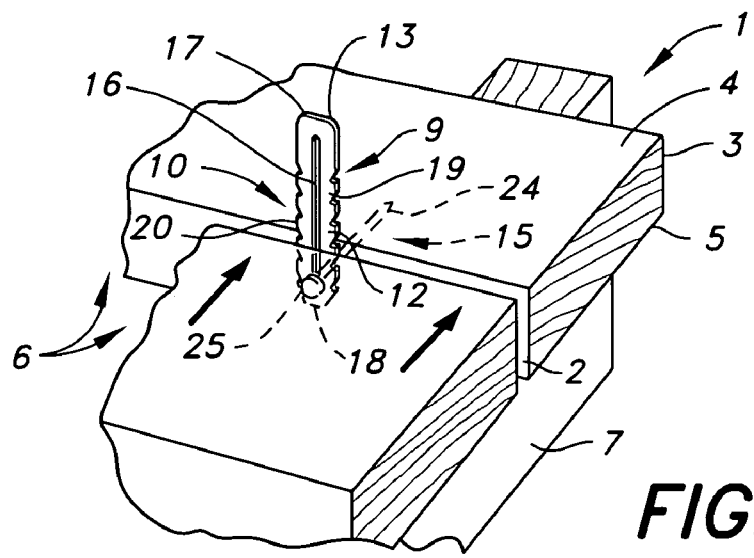
FIG._3B
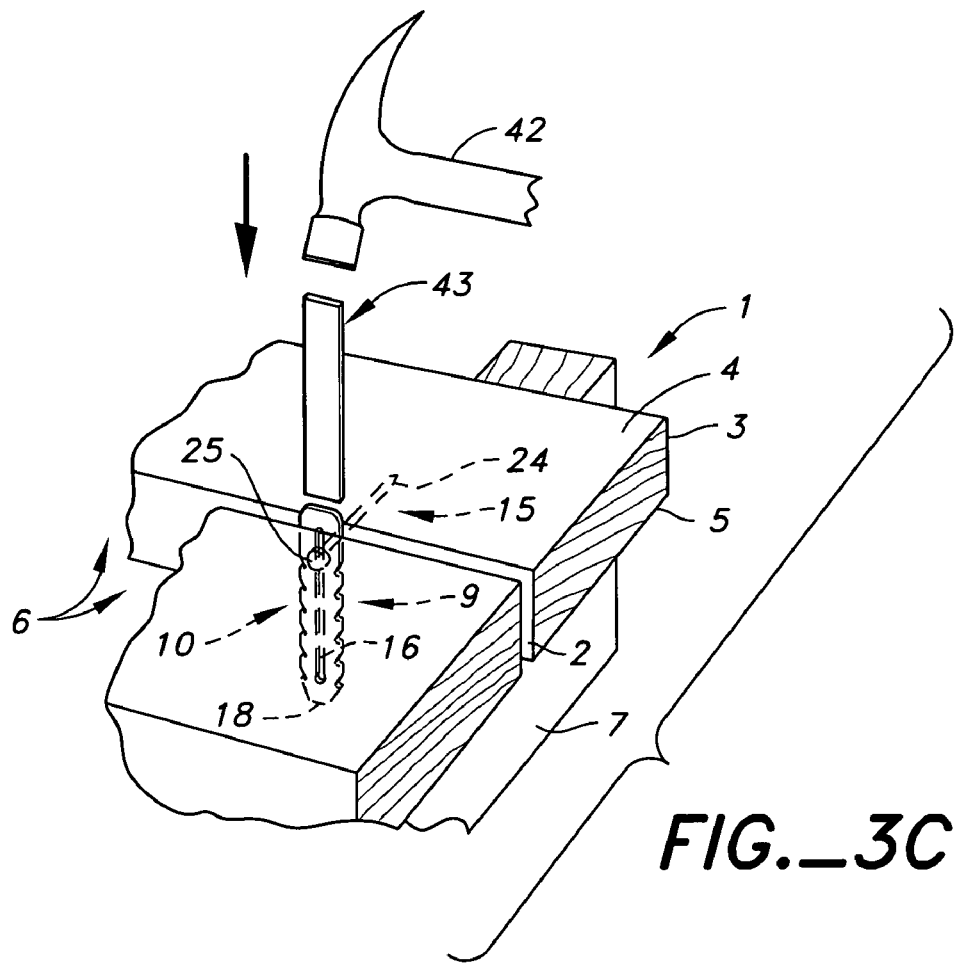
FIG._3C

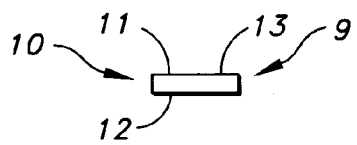
FIG._3D
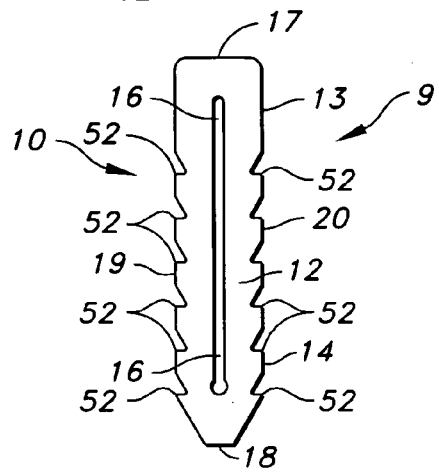
FIG._3E
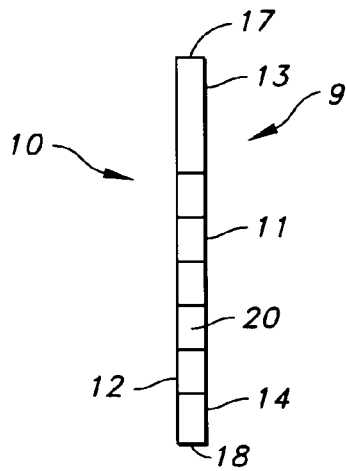
FIG._3F
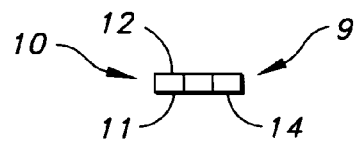
FIG._3G
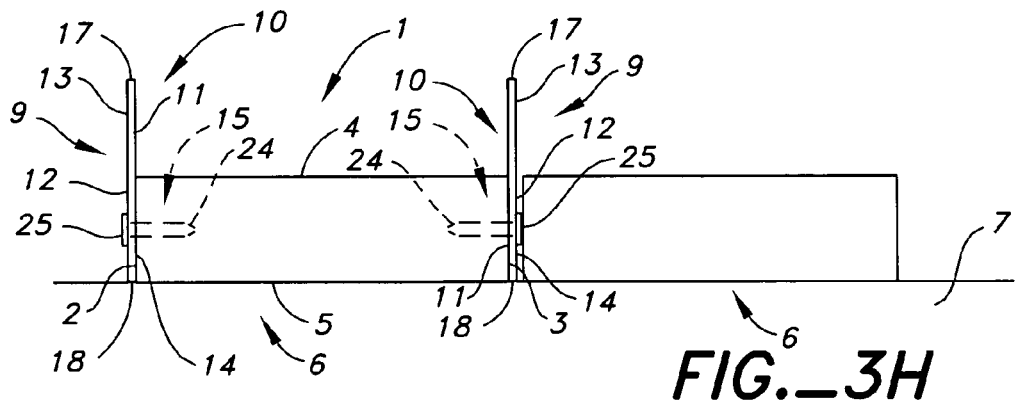
FIG._3H
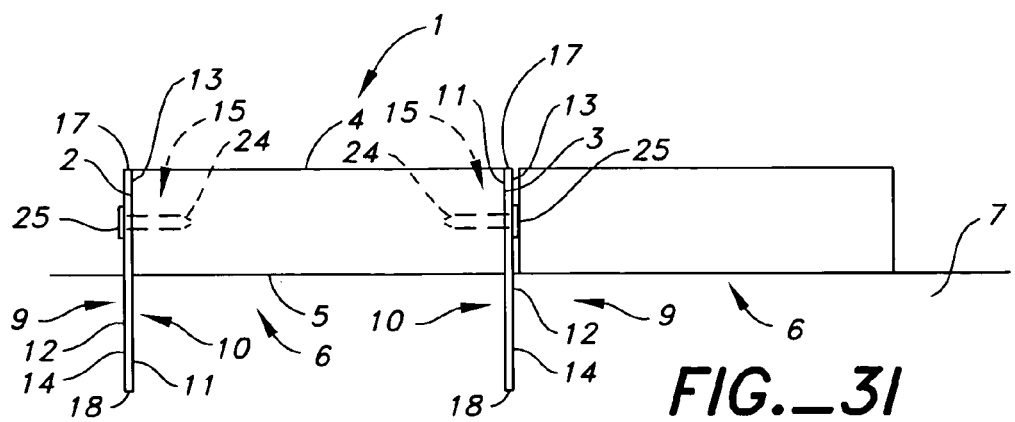
FIG._3I

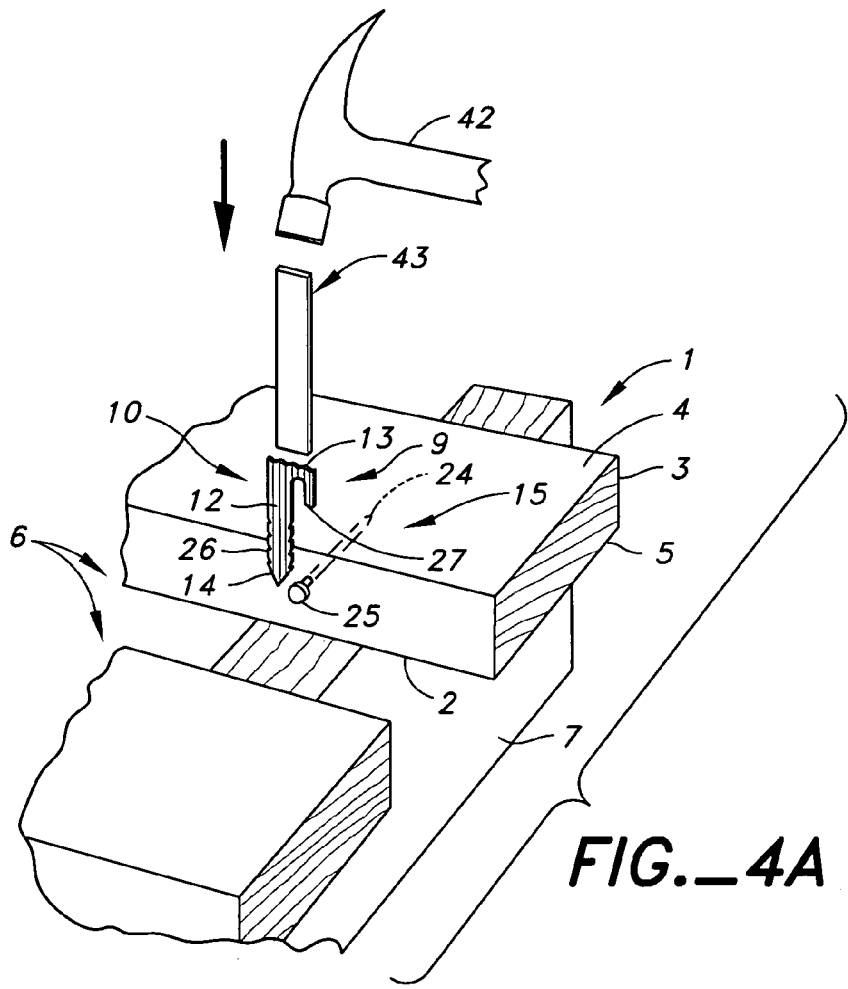
FIG._4A
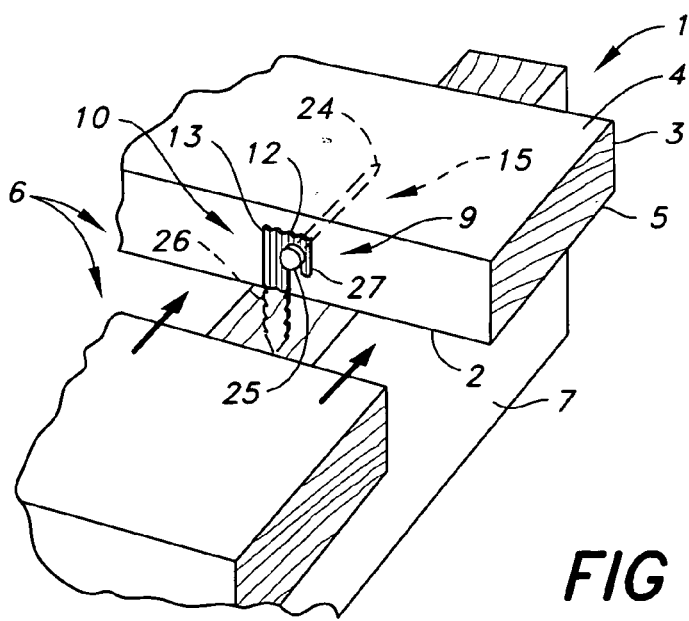
FIG _4B

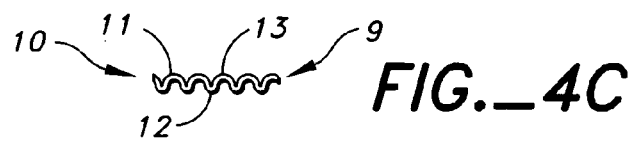
FIG._4C
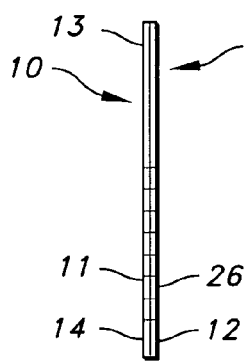
FIG._4D
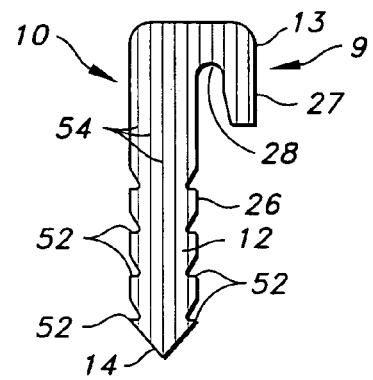
FIG._4E
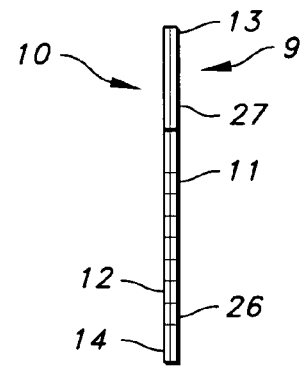
FIG._4F
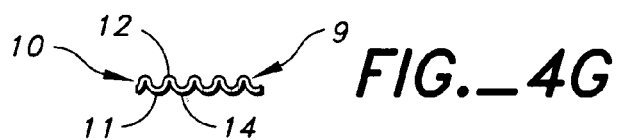
FIG._4G
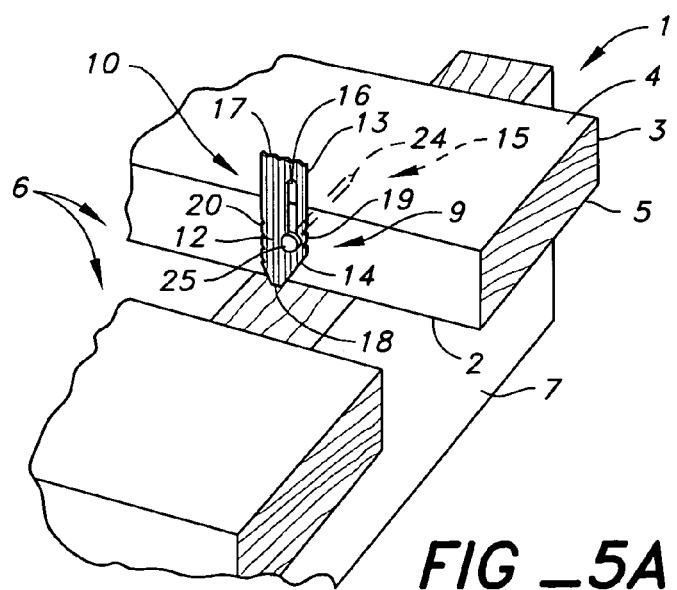
FIG _5A

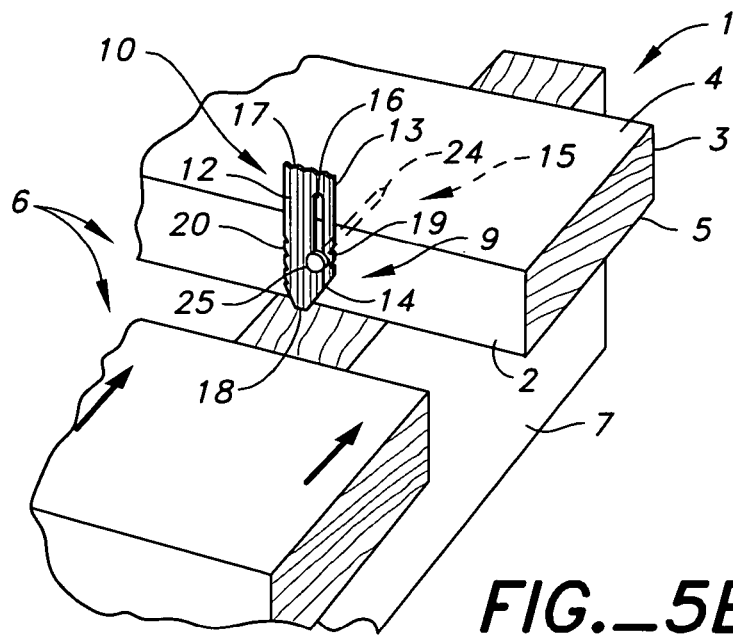
FIG._5B
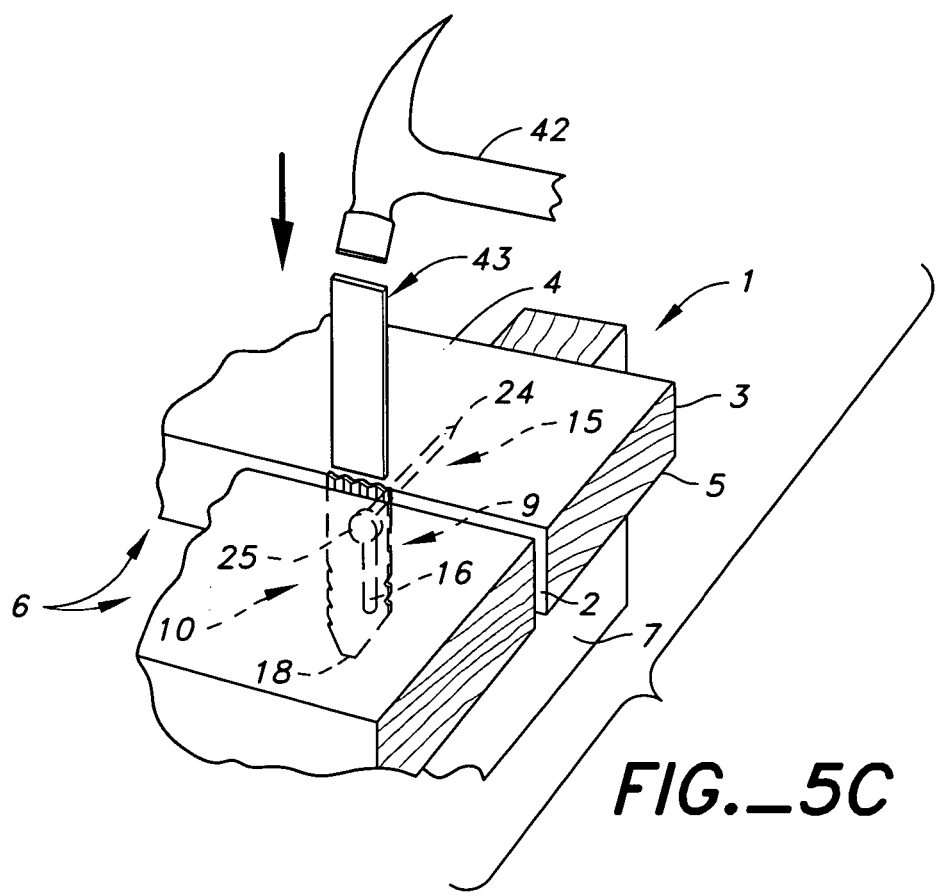
FIG._5C

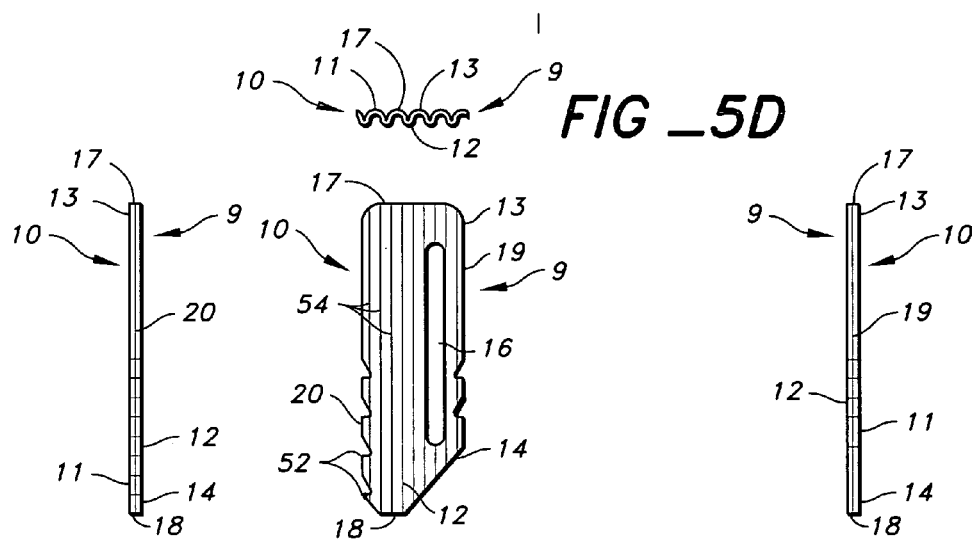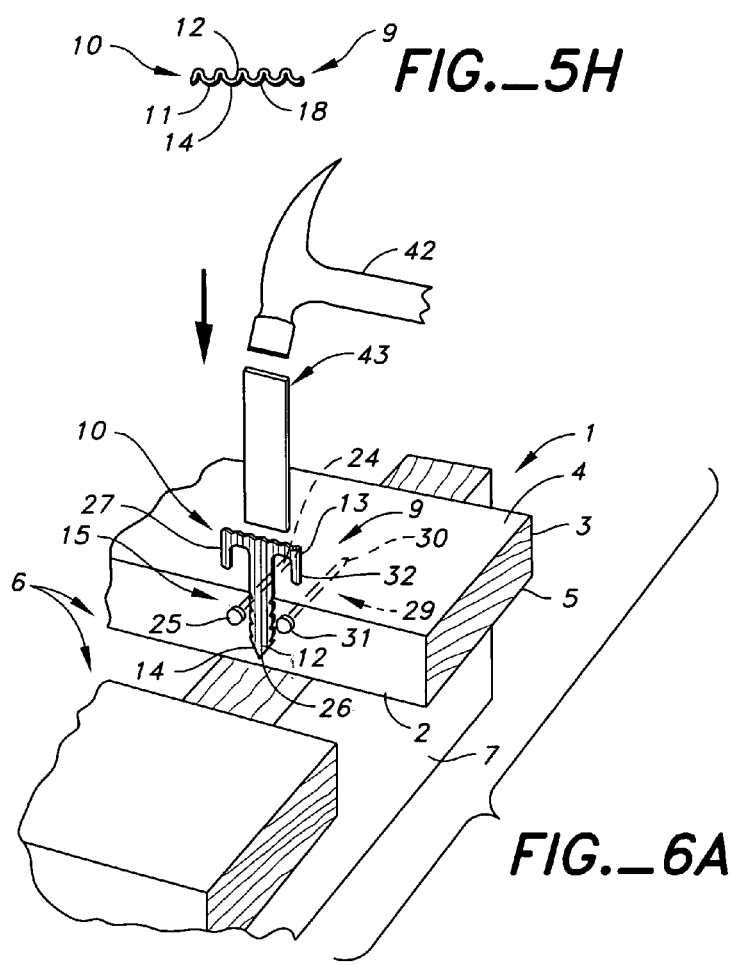

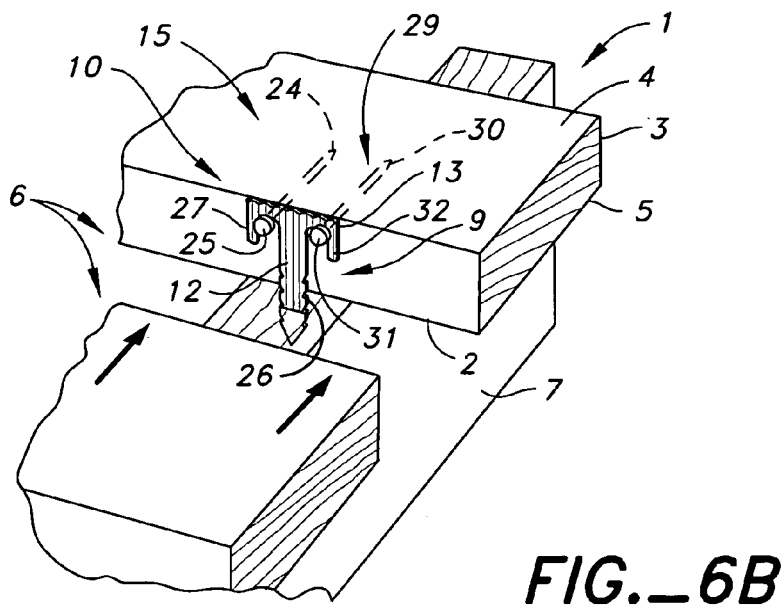
FIG._6B
FIG._6C
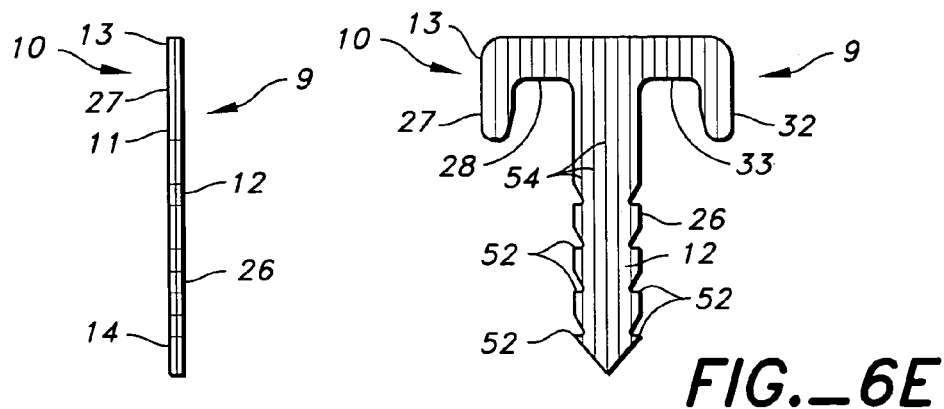
FIG _6D
FIG._6E
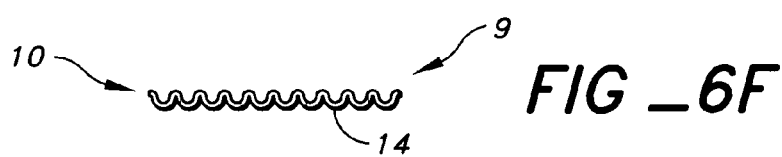
FIG _6F

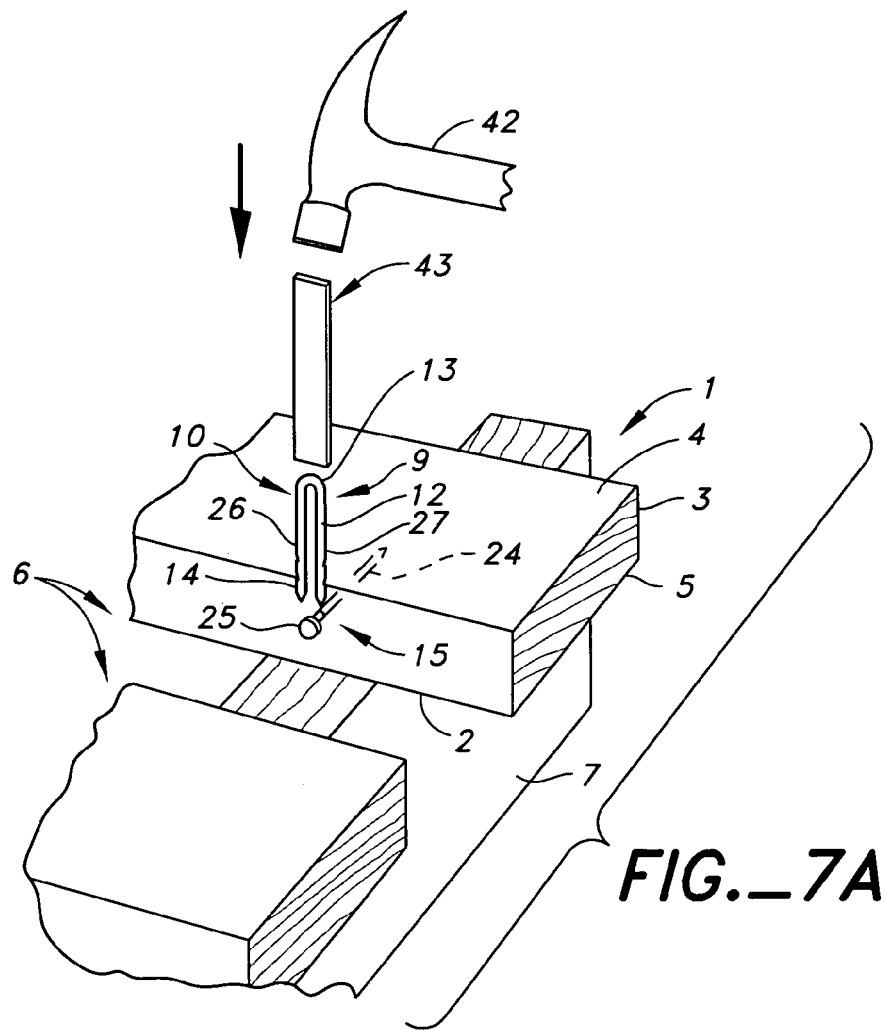
FIG._7A
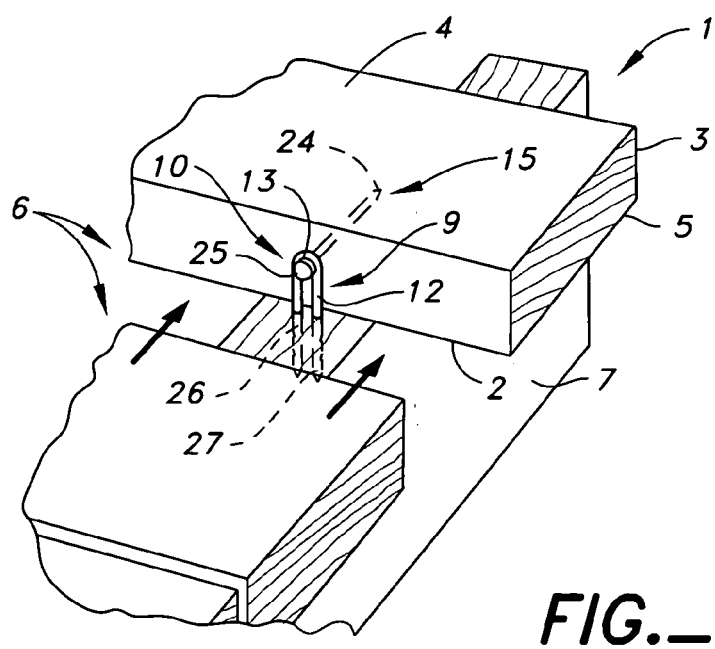
FIG._7B

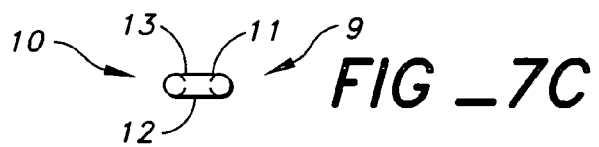
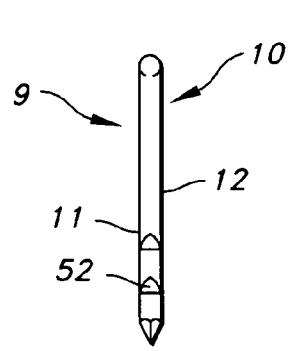
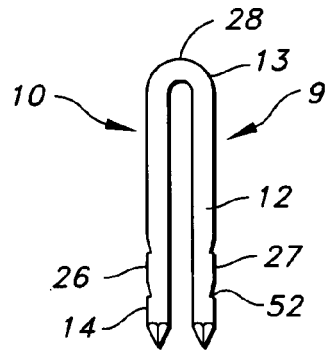
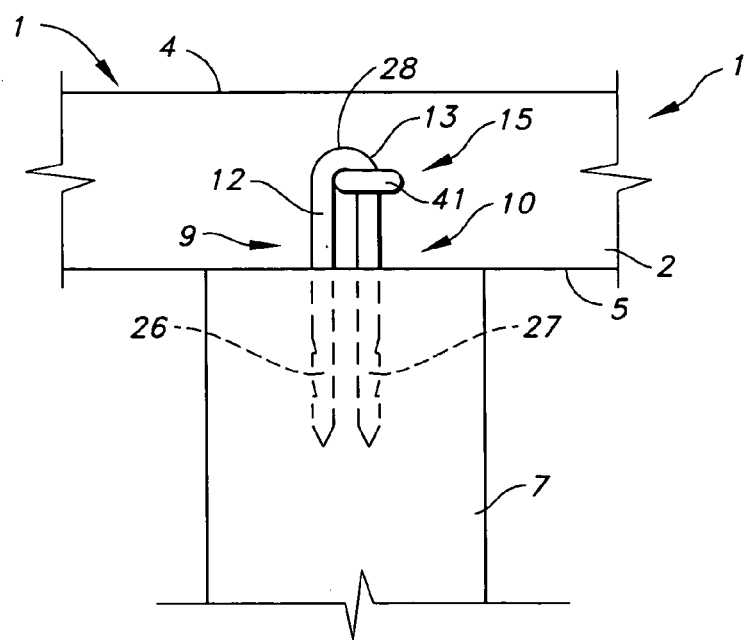

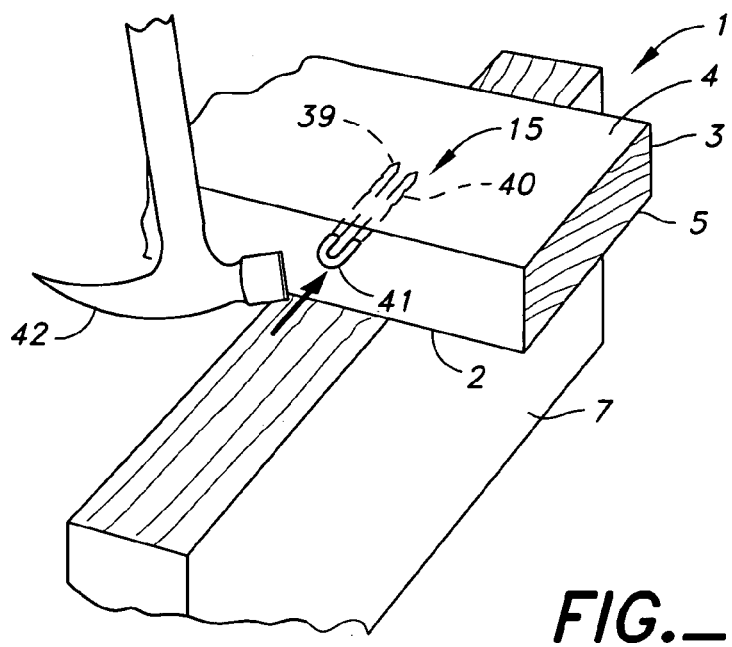
FIG._7H
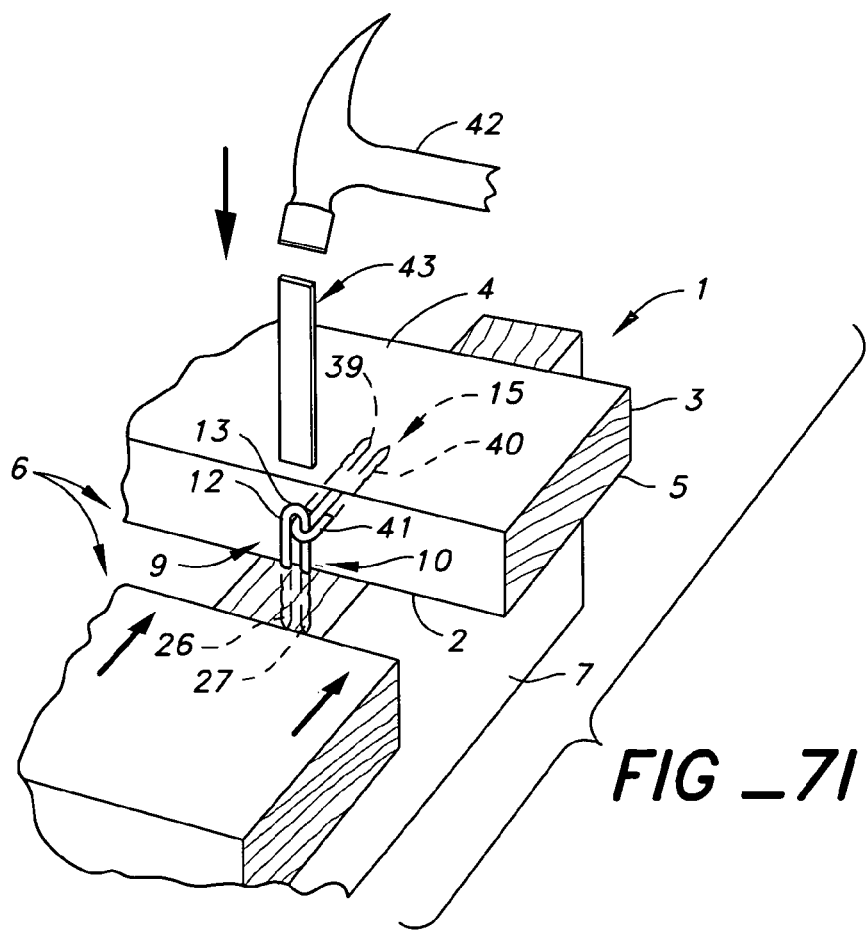
FIG _7I

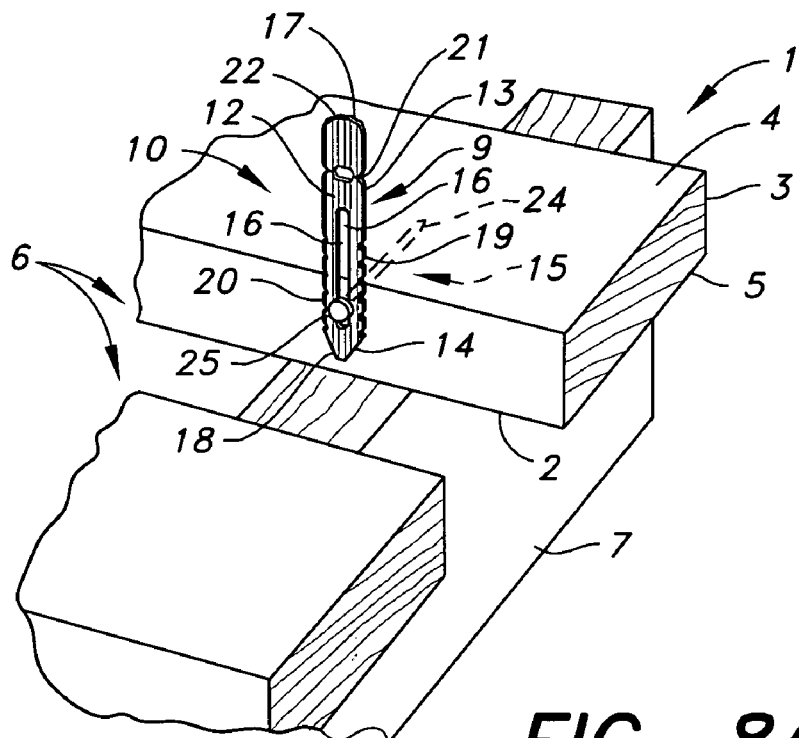
FIG._8A
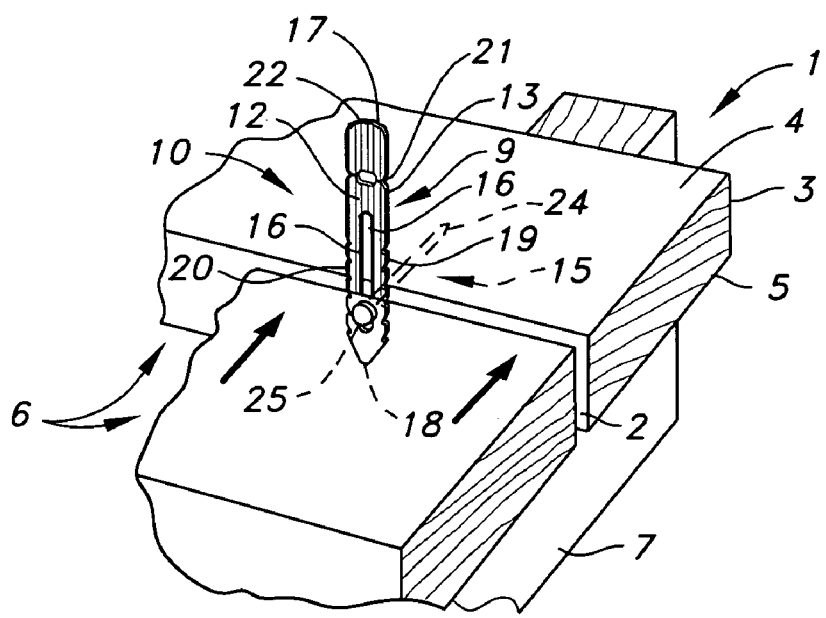
FIG._8B

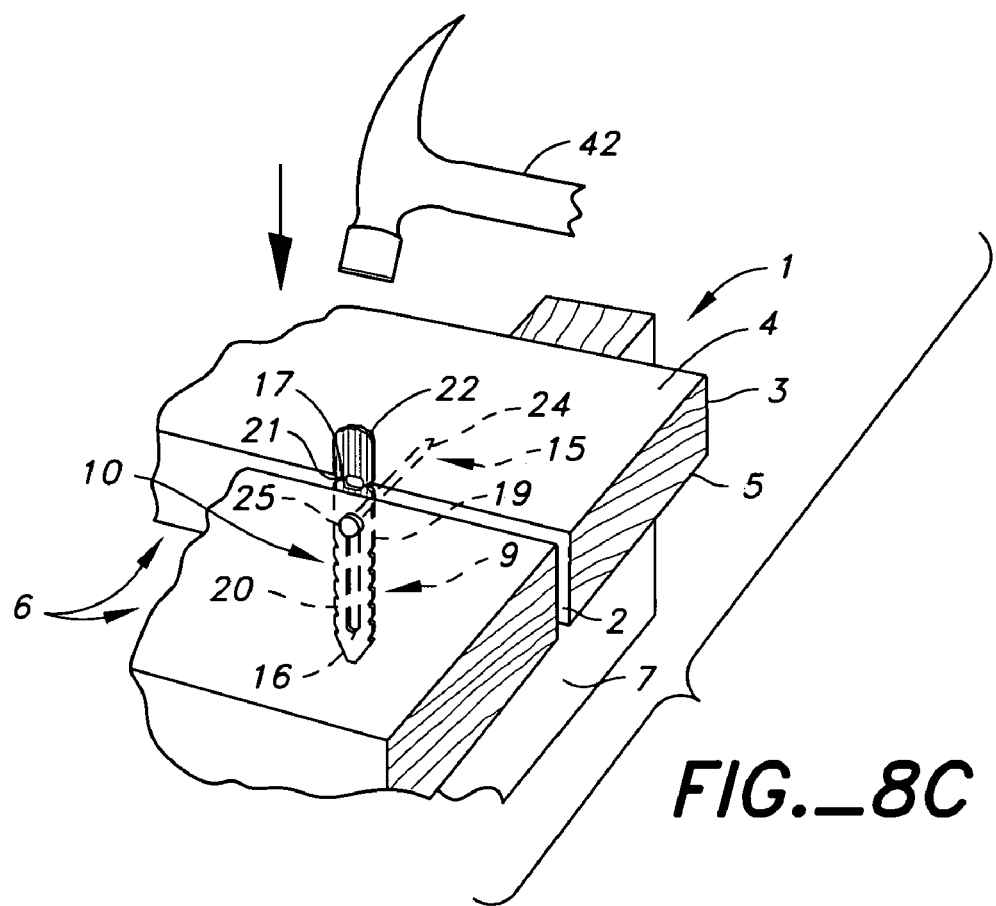
FIG._8C
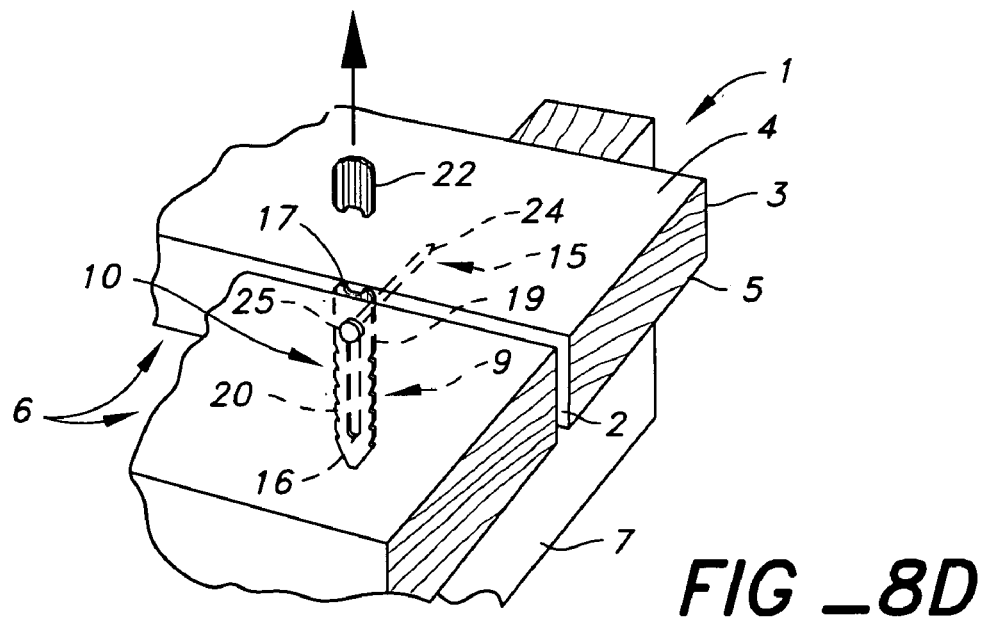
FIG_8D

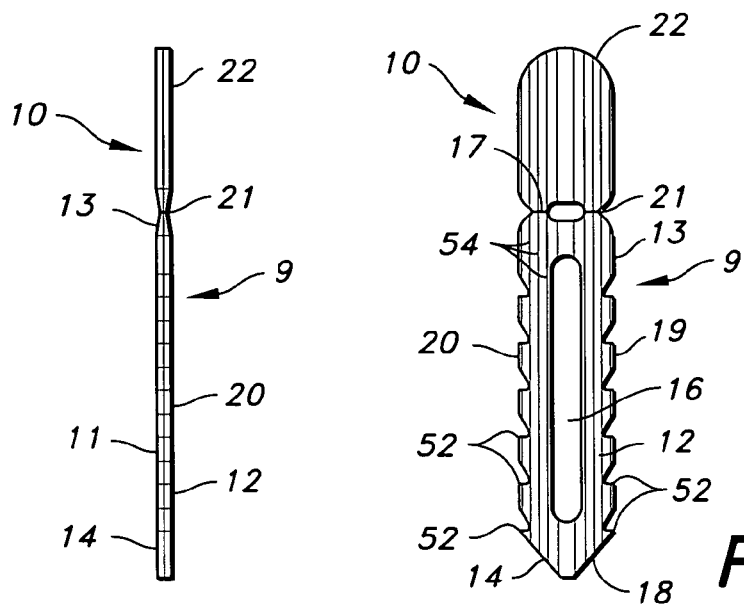
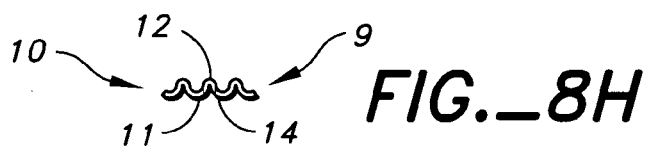
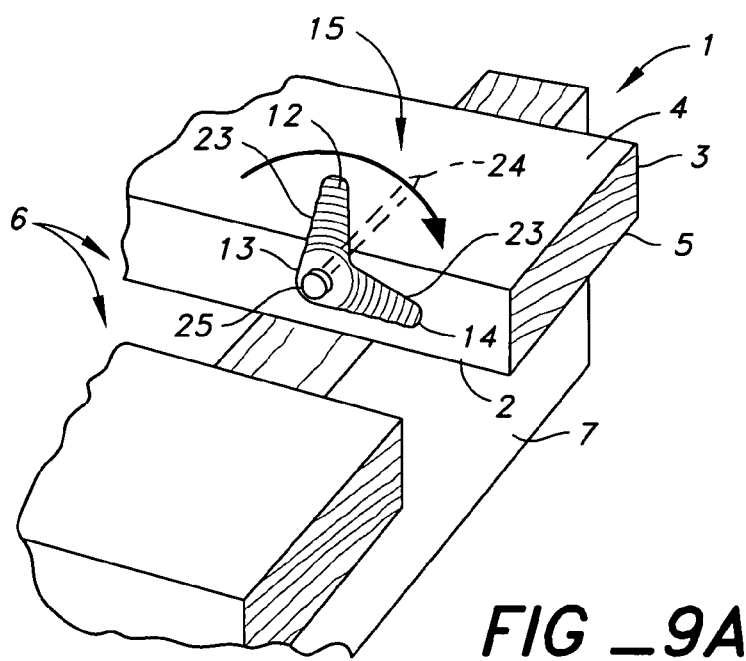

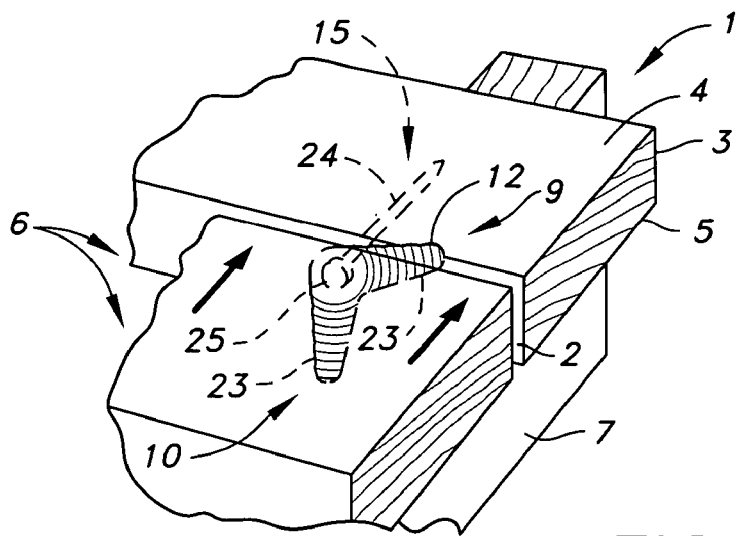
FIG._9B
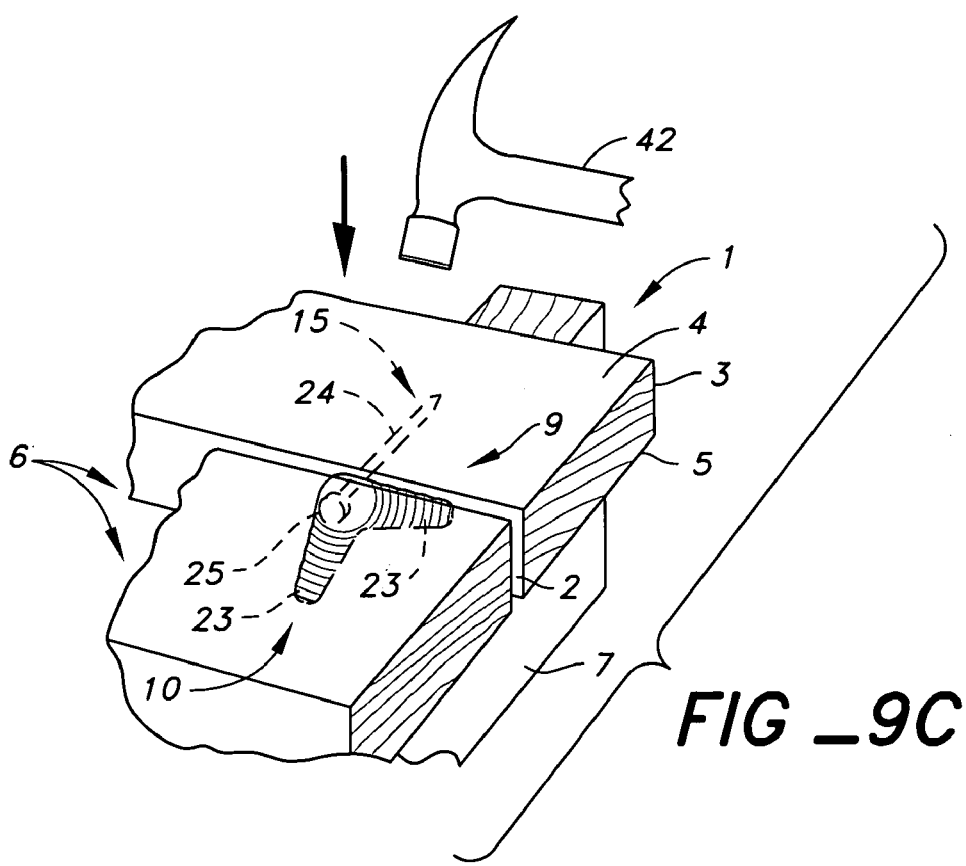
FIG _9C

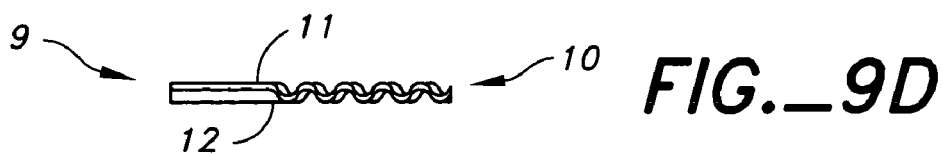
FIG._9D
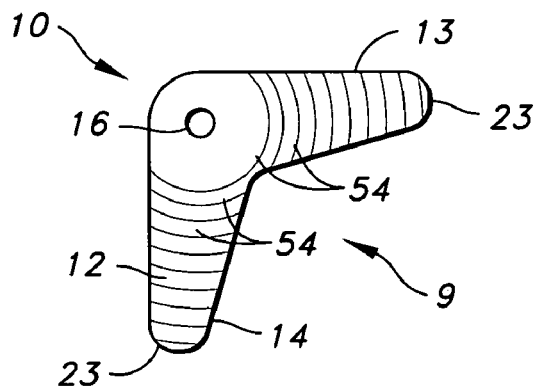
FIG._9E
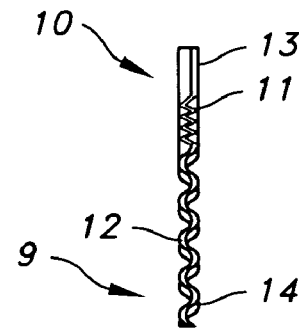
FIG._9F
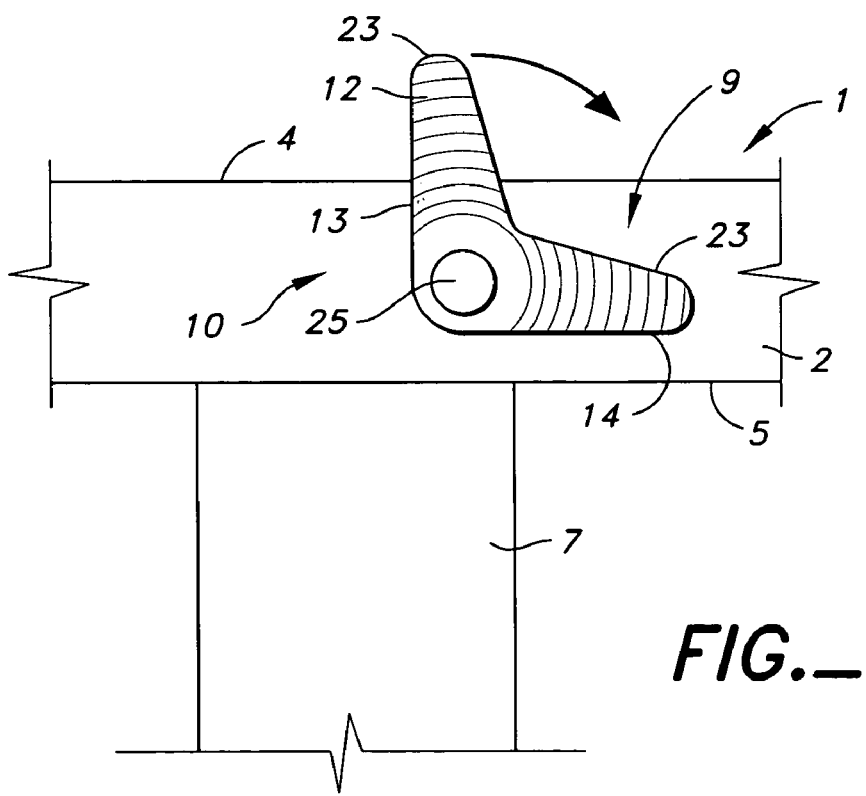
FIG._9G

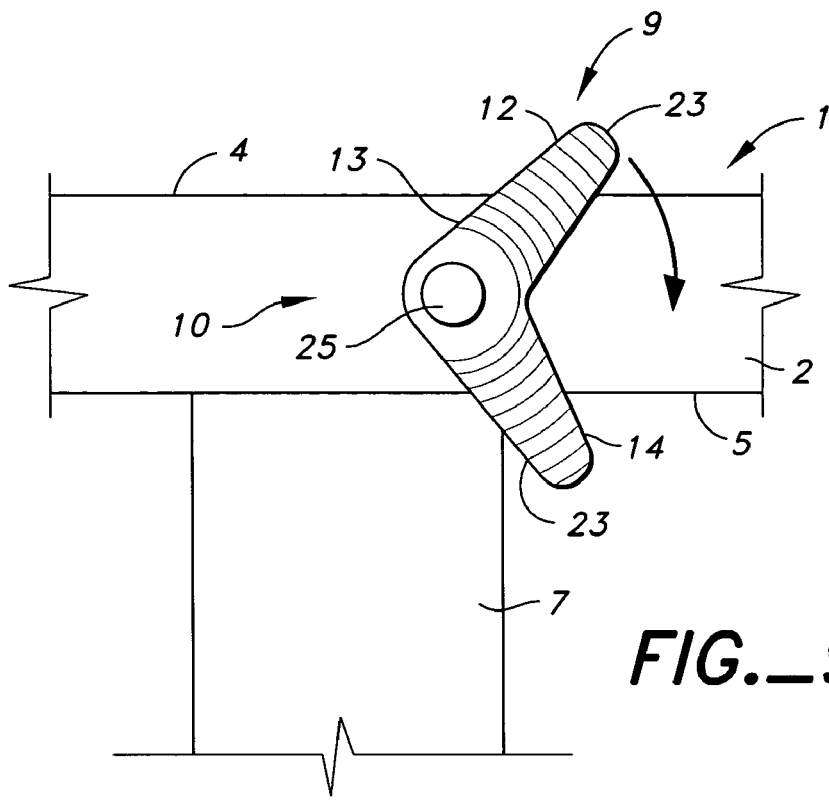
FIG._9H
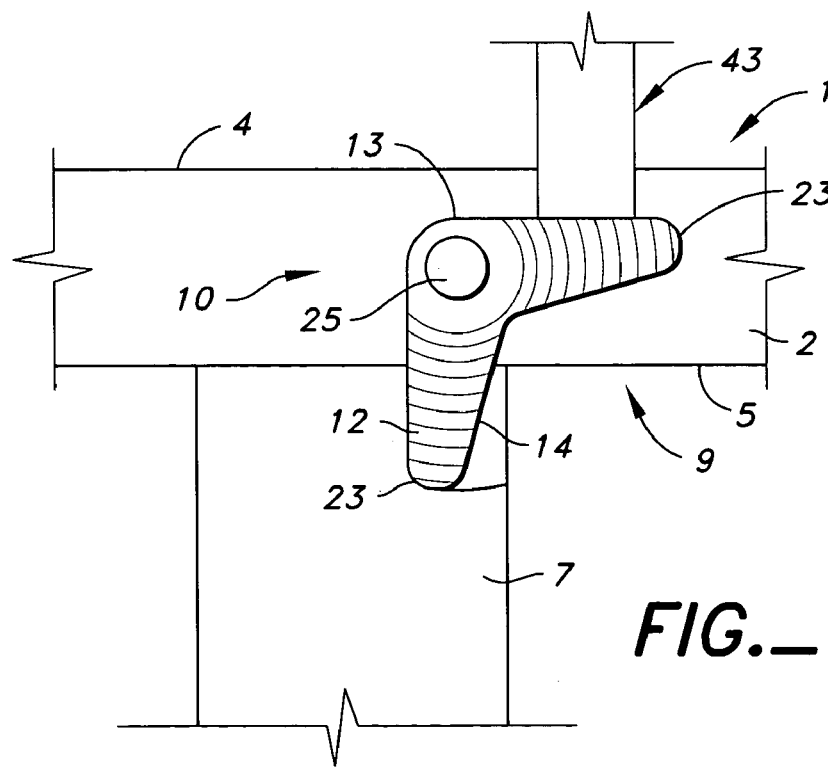
FIG._9I

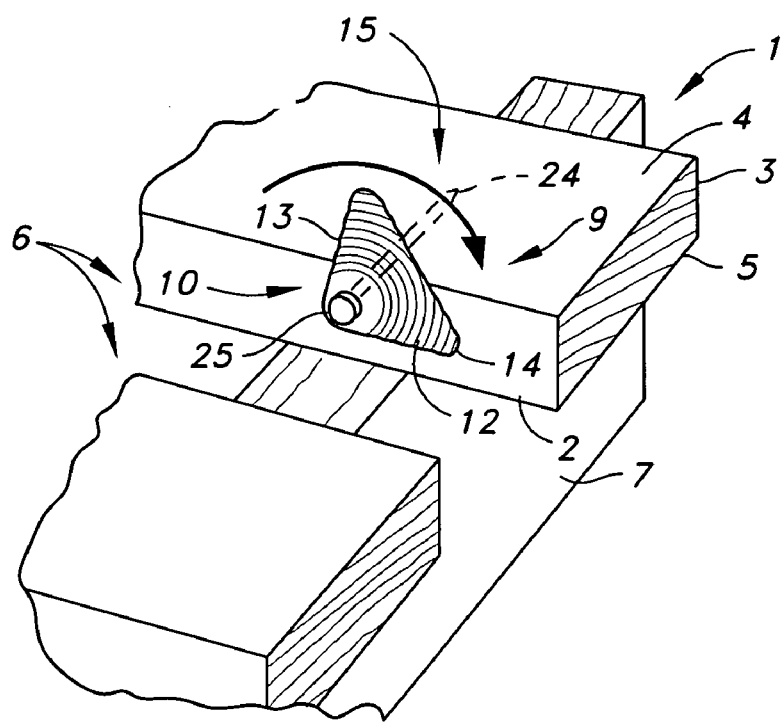
FIG._10A
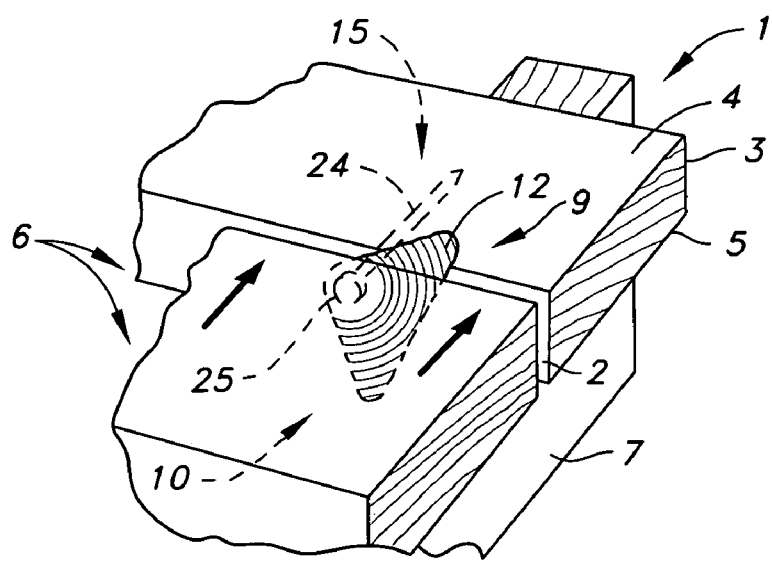
FIG._10B

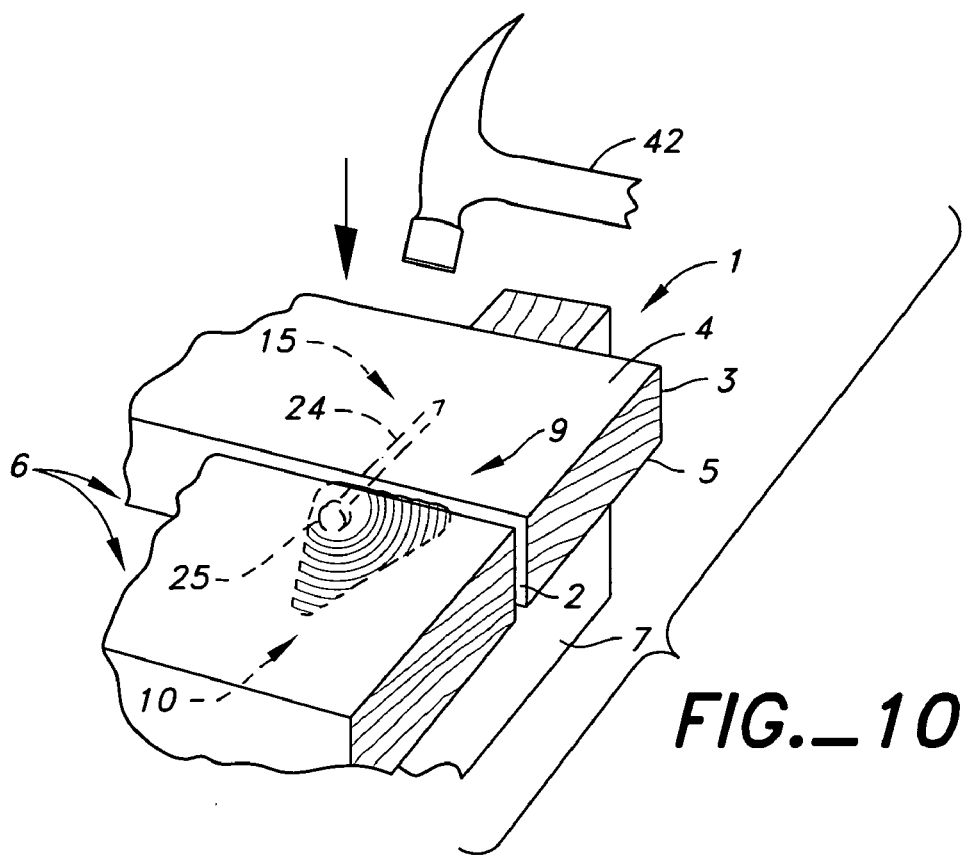
FIG._10C
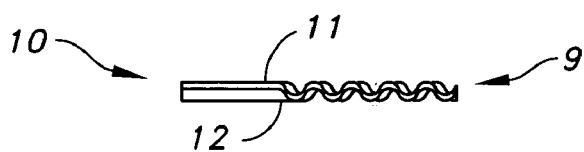
FIG._10D
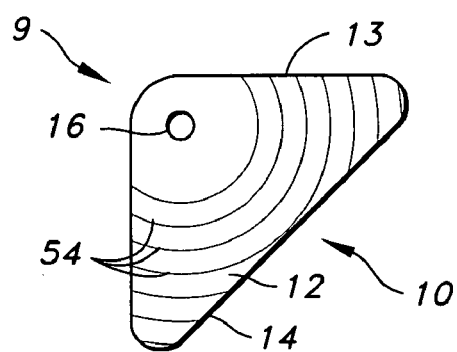 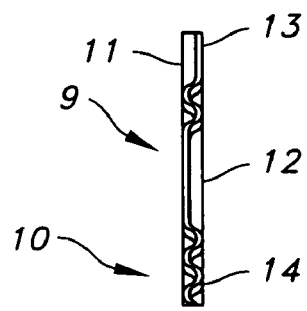
FIG _10E  FIG _10F

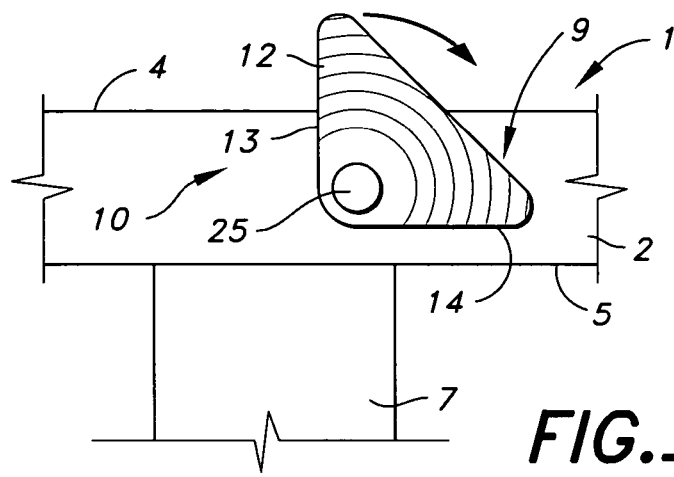
FIG._10G
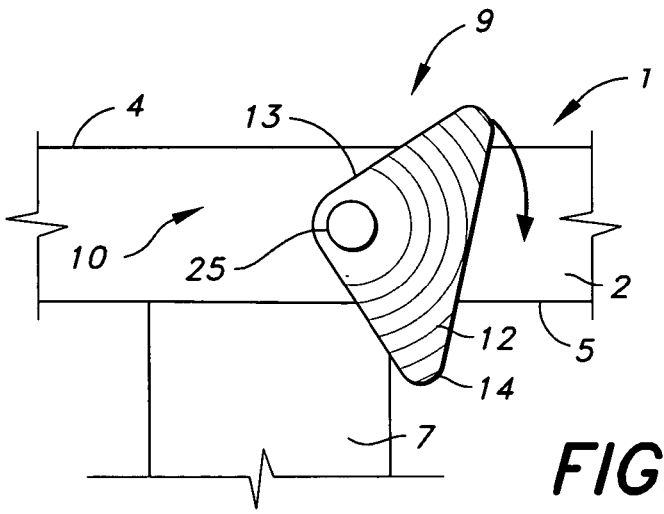
FIG._10H
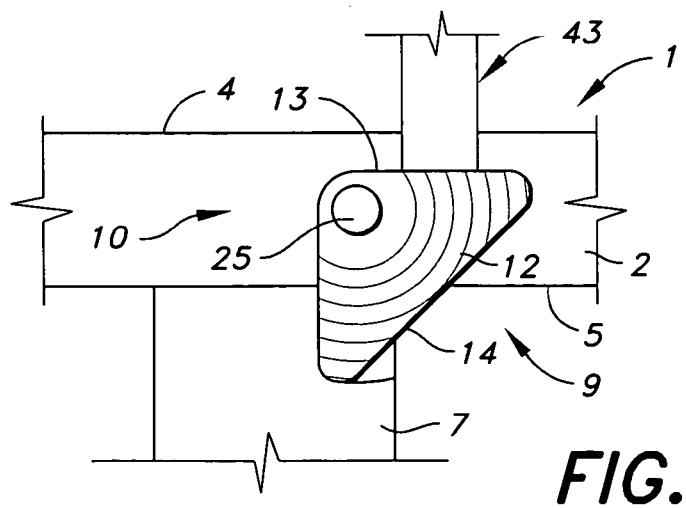
FIG._10I

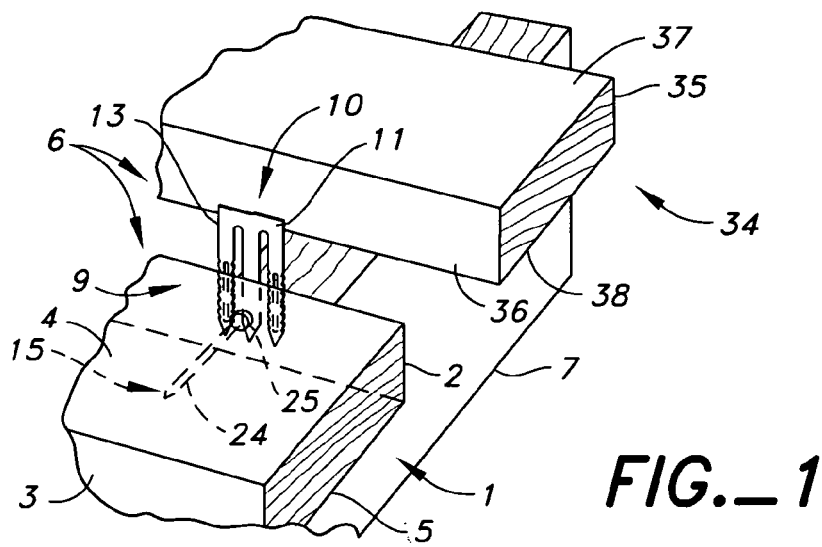
FIG._11A
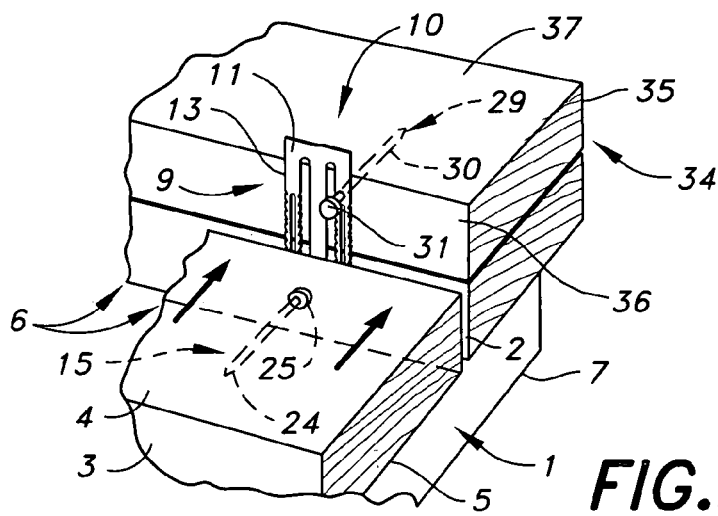
FIG._11B
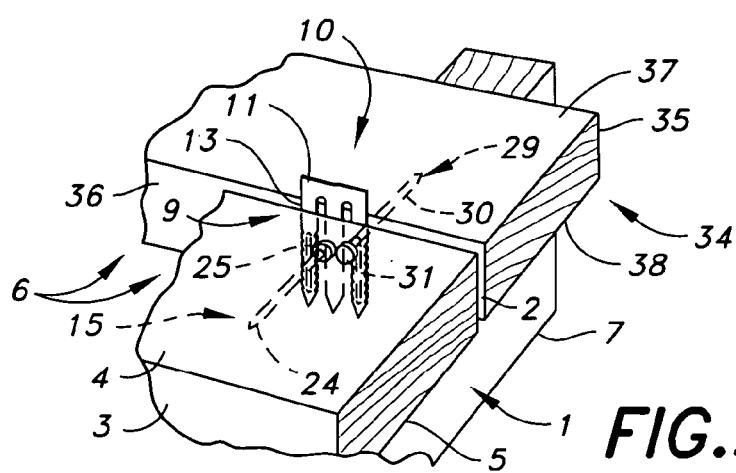
FIG._11C

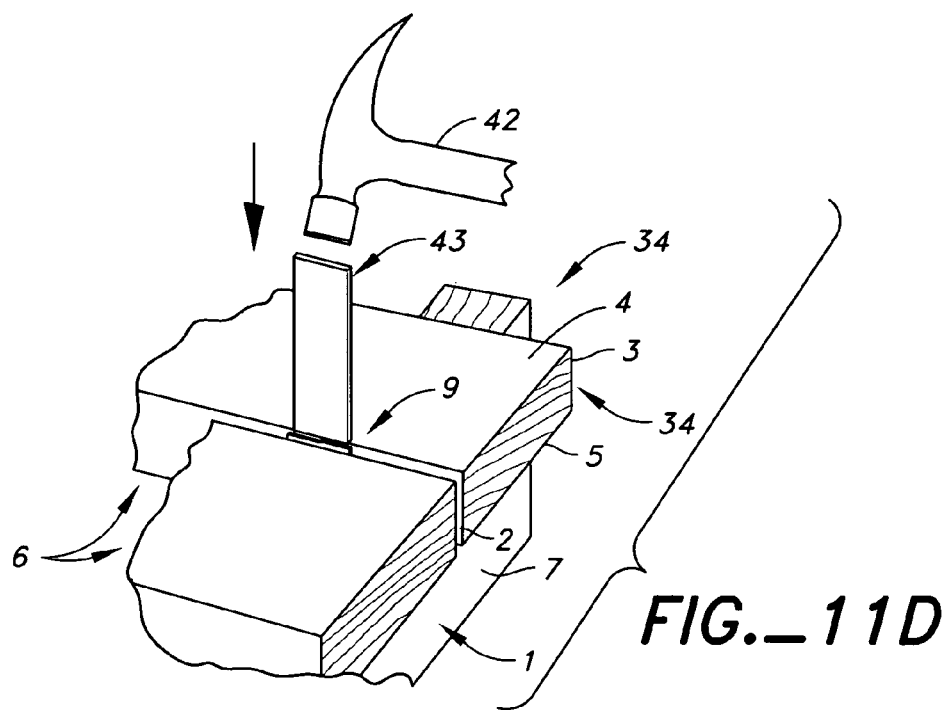
FIG._11D
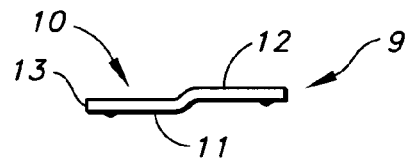
FIG._11E
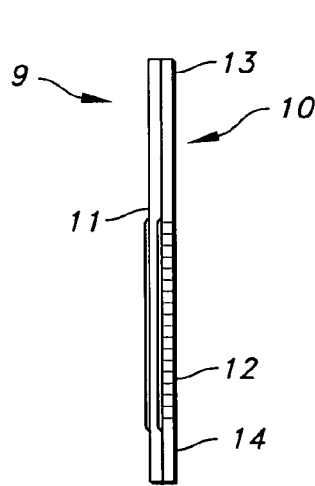
FIG._11F
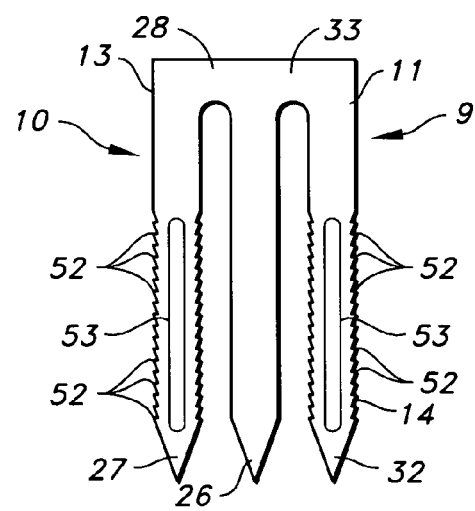
FIG _11G
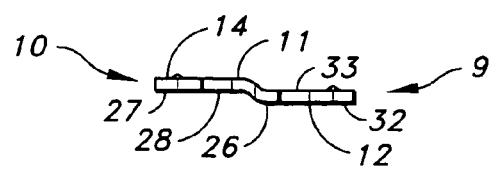
FIG _11H

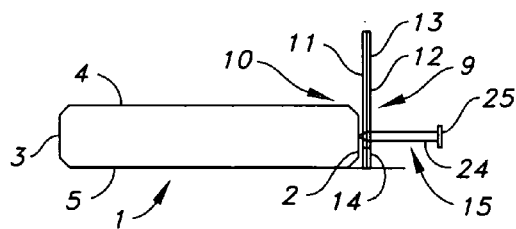
FIG._11I
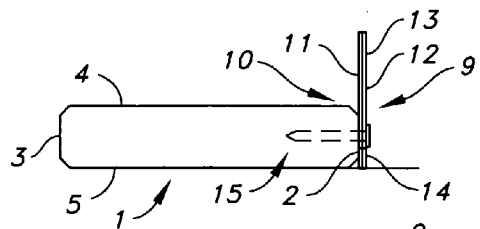
FIG._11J
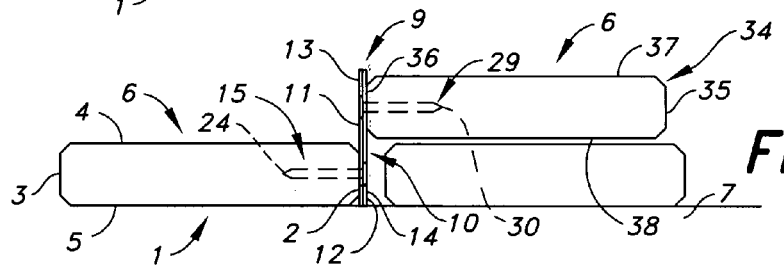
FIG._11K
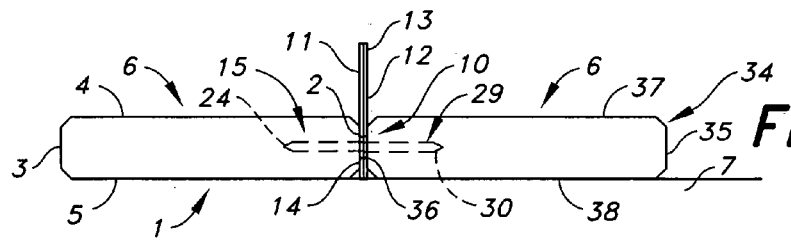
FIG._11L
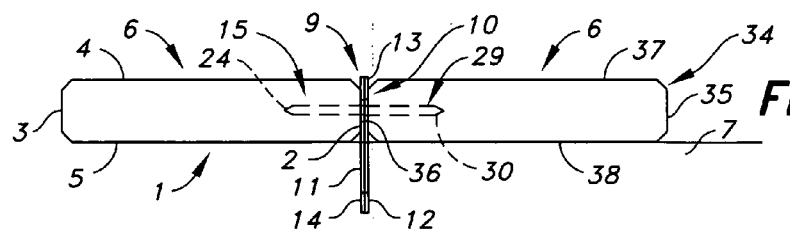
FIG._11M
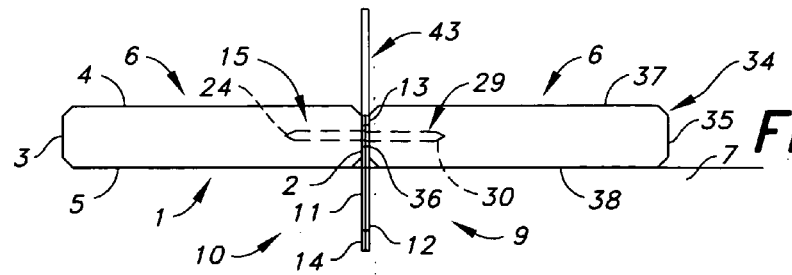
FIG._11N

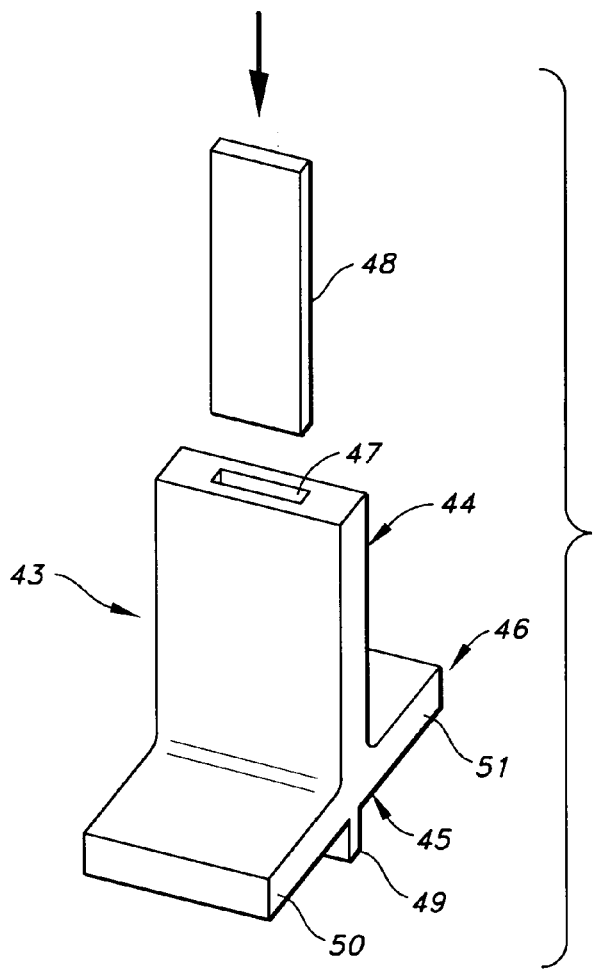
FIG._12A
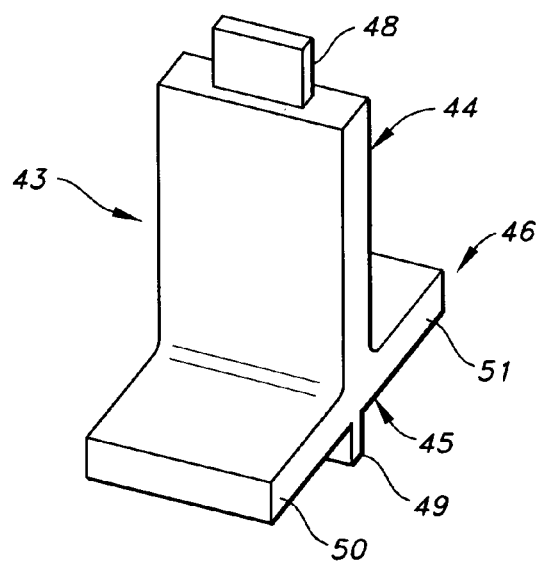
FIG._12B

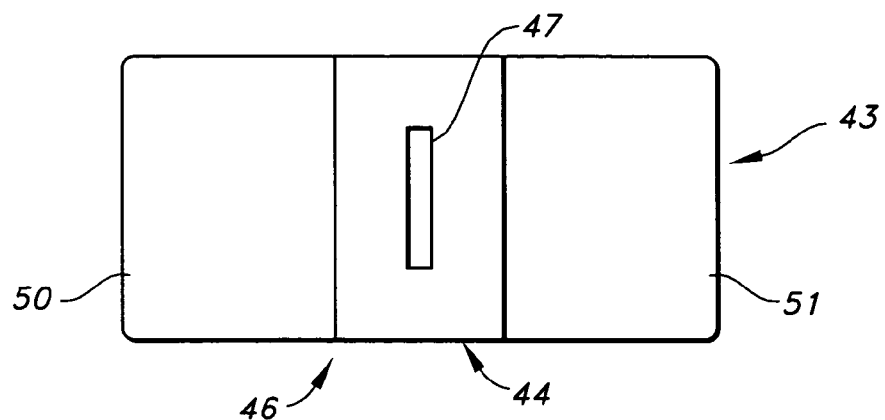
FIG._12C
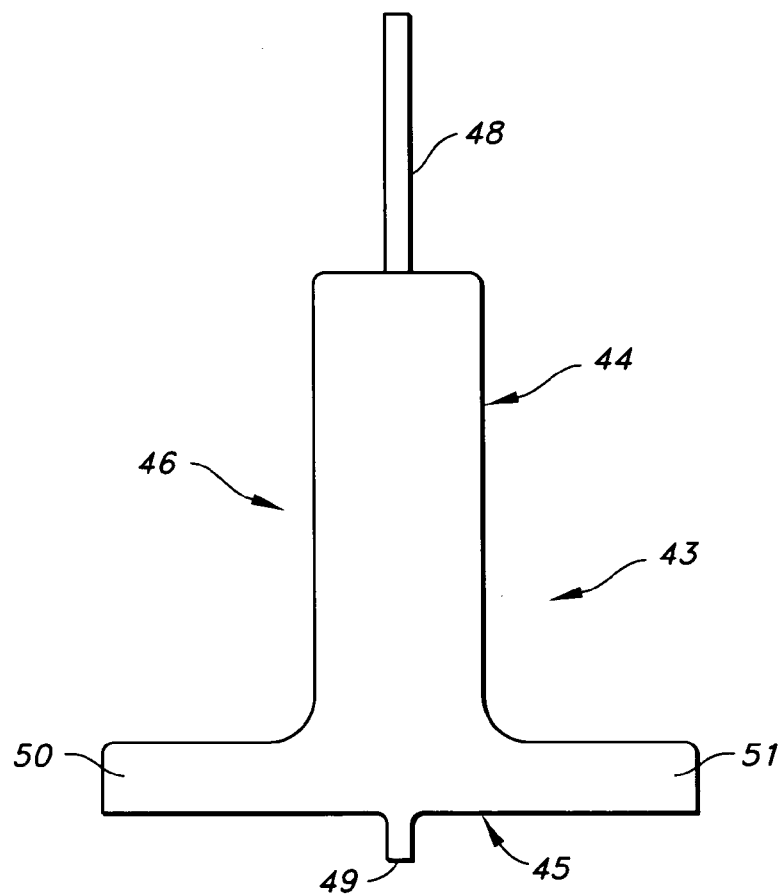
FIG._12D

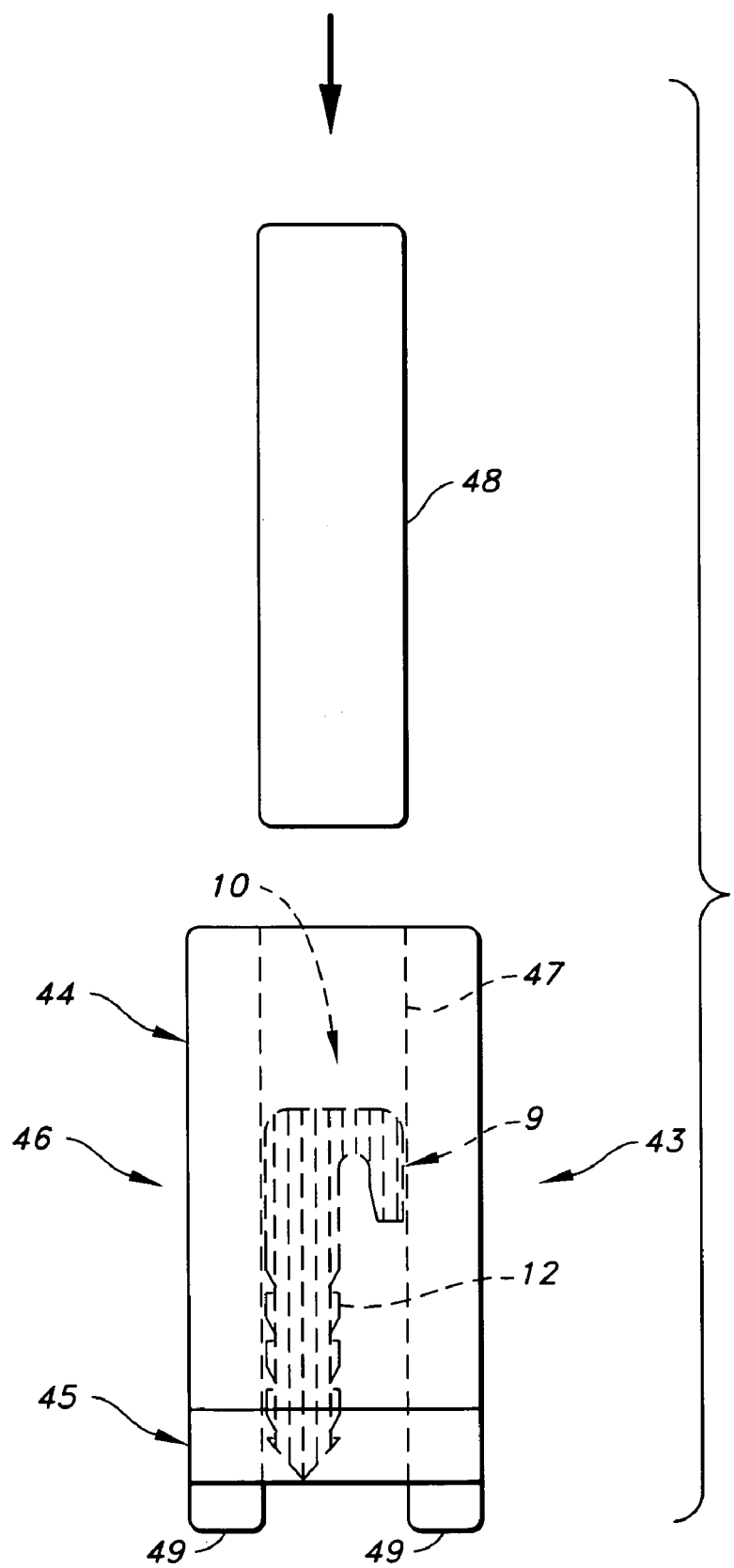

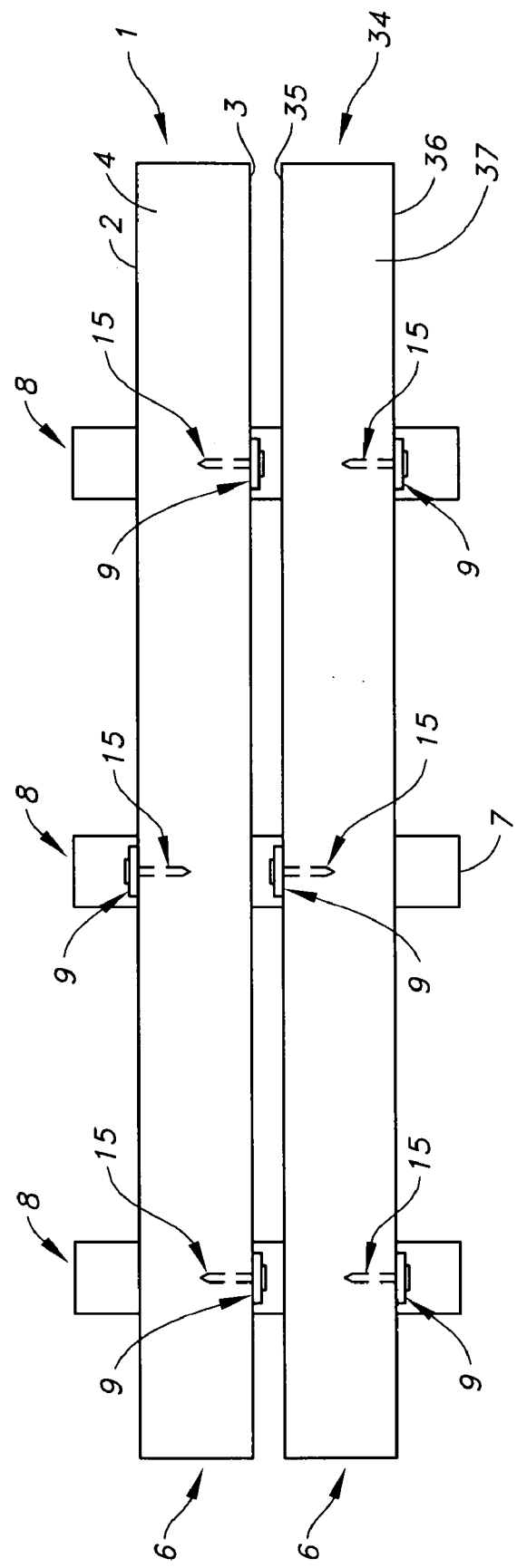
FIG._13

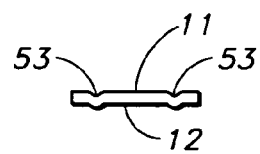
FIG_14A
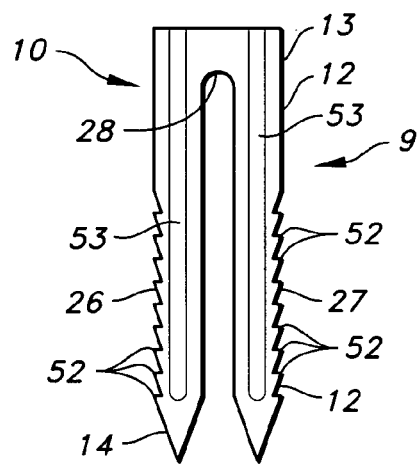
FIG._14B
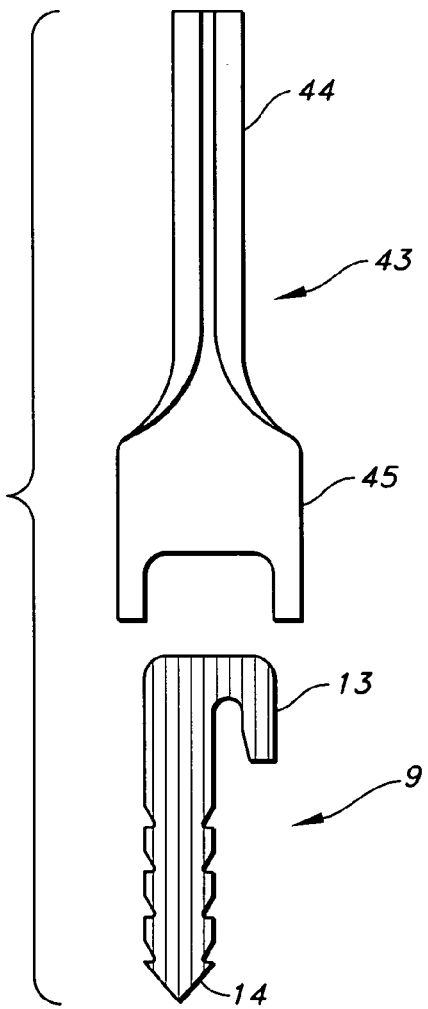
FIG._15

DECK BOARD TIE CONNECTOR, CONNECTION AND METHOD

BACKGROUND OF THE INVENTION

This invention relates to a system for constructing a structure in which supporting members carry transverse supported members, the method of construction and the special clip used in the construction. Examples of such structures are house and patio decks, boardwalks, benches, stair treads, bench seating, trellis systems and the like.

Decks are usually built onto the side of a house, rather than as freestanding structures, although they may be either. If built onto the side of a house, a ledger board or header is fastened to the side of the house, usually with lag screws, expansion bolts, or carriage bolts, but any fastener can be used. The vertical placement of the ledger board or header determines the height of the deck. According to standard practice, the deck area is then marked off using strings and batterboards. The top few inches of soil where the deck is to be constructed is removed and a sheet of black polyethylene can be placed over the ground so that vegetation does not grow up through the deck when it is completed. Holes for the supporting posts are then located and dug. The holes are generally at least two feet deep, but are recommended to always be deeper than the frost line. The posts can be set in the ground, in gravel or concrete, or on concrete piers. The posts are plumbed and aligned with each other so that the deck will be plumb with straight edges. Beams are then used to connect the posts, and joists—the supporting members— are attached on top of the beams. Joist hangers can be used or the joists can be screwed or nailed to the headers. The joists are typically placed on 16-inch or 24-inch centers. Decking—the supported members—is placed with the growth rings facing down so that they will not be visible in the completed deck. A ⅛" space is usually left between the decking boards to allow for expansion. A 10d nail can be used as a convenient spacer. Decking is traditionally fastened down to the joists with spiral shank nails, ring shank nails, or coated screws. When pressure-treated wood is used, the manufacturer's suggestions for nail spacing and the size of nails should be followed. Decking can be laid down in a number of patterns, such as a herringbone, but the traditional method is to lay the decking parallel to the house. In any case, the decking must be laid transversely, whether at an angle or not, across the joists, so that at least two supporting members support each supported member. Rails and often stairs are then added to complete the deck.

The standard method of nailing directly through the deck boards has a number of attendant problems, including nails backing out of the wood with seasonal swelling and shrinkage, rusting of the nails and concomitant staining of the deck boards, wood bruises of the deck boards by hammer marks, and loosening of the boards due to nail pullout.

Some of these problems are addressed by a variety of existing deck tie and clips, but none of these excel the present invention in simplicity of design, ease of installation, or economy.

SUMMARY OF THE INVENTION

The gist of the present invention is the use of a clip in a system and method for constructing a structure in which the clip is attached to an adjoining supported member and driven directly into the supporting member. In this manner, the supported members are connected to the supporting members without any clip interposed therebetween.

An object of the present invention is to construct a structure such as a deck using the present method according to which no fasteners are driven through the top surface of the supported deck boards, thereby giving the appearance that no nails are used in the construction of the structure.

Another object is to provide a structure in which no fasteners are driven through the top surface of the supported deck boards, thereby eliminating staining due to rusting fastener heads.

A further object is to provide a method of installation which is easy, fast and provides a relatively planar surface with ordinary diligence.

Still another object is to provide a system which will remain relatively secure through seasonal changes that normally cause shrinkage and swelling of the wood.

BRIEF DESCRIPTION OF THE DRAWINGS

FIG. 1A is a perspective view of an embodiment of the method of the present invention.

FIG. 1B is a perspective view of an embodiment of the method of the present invention.

FIG. 1C is a top plan view of an embodiment of the connector of the present invention.

FIG. 1D is a front elevation view of an embodiment of the connector of the present invention.

FIG. 1E is a side elevation view of an embodiment of the connector of the present invention.

FIG. 1F is a bottom plan view of an embodiment of the connector of the present invention.

FIG. 1G is a side elevation view of a connection formed according to the method of the present invention.

FIG. 2A is a perspective view of an embodiment of the method of the present invention.

FIG. 2B is a perspective view of an embodiment of the method of the present invention.

FIG. 2C is a top plan view of an embodiment of the connector of the present invention.

FIG. 2D is a front elevation view of an embodiment of the connector of the present invention.

FIG. 2E is a side elevation view of an embodiment of the connector of the present invention.

FIG. 2F is a bottom plan view of an embodiment of the connector of the present invention.

FIG. 3A is a perspective view of an embodiment of the method of the present invention.

FIG. 3B is a perspective view of an embodiment of the method of the present invention.

FIG. 3C is a perspective view of an embodiment of the method of the present invention.

FIG. 3D is a top plan view of an embodiment of the connector of the present invention.

FIG. 3E is a front elevation view of an embodiment of the connector of the present invention.

FIG. 3F is a side elevation view of an embodiment of the connector of the present invention.

FIG. 3G is a bottom plan view of an embodiment of the connector of the present invention.

FIG. 3H is a side elevation view of an embodiment of the method of the present invention.

FIG. 3I is a side elevation view of an embodiment of the method of the present invention.

FIG. 4A is a perspective view of an embodiment of the method of the present invention.

FIG. 4B is a perspective view of an embodiment of the method of the present invention.

FIG. 4C is a top plan view of an embodiment of the connector of the present invention.

FIG. 4D is a side elevation view of an embodiment of the connector of the present invention.

FIG. 4E is a front elevation view of an embodiment of the connector of the present invention.

FIG. 4F is a side elevation view of an embodiment of the connector of the present invention.

FIG. 4G is a bottom plan view of an embodiment of the connector of the present invention.

FIG. 5A is a perspective view of an embodiment of the method of the present invention.

FIG. 5B is a perspective view of an embodiment of the method of the present invention.

FIG. 5C is a perspective view of an embodiment of the method of the present invention.

FIG. 5D is a top plan view of an embodiment of the connector of the present invention.

FIG. 5E is side elevation view of an embodiment of the connector of the present invention.

FIG. 5F is a front elevation view of an embodiment of the connector of the present invention.

FIG. 5G is a side elevation view of an embodiment of the connector of the present invention.

FIG. 5H is a bottom plan view of an embodiment of the connector of the present invention.

FIG. 6A is a perspective view of an embodiment of the method of the present invention.

FIG. 6B is a perspective view of an embodiment of the method of the present invention.

FIG. 6C is a top plan view of an embodiment of the connector of the present invention.

FIG. 6D is a side elevation view of an embodiment of the connector of the present invention.

FIG. 6E is a front elevation view of an embodiment of the connector of the present invention.

FIG. 6F is a bottom plan view of an embodiment of the connector of the present invention.

FIG. 7A is a perspective view of an embodiment of the method of the present invention.

FIG. 7B is a perspective view of an embodiment of the method of the present invention.

FIG. 7C is a top plan view of an embodiment of the connector of the present invention.

FIG. 7D is a side elevation view of an embodiment of the connector of the present invention.

FIG. 7E is a front elevation view of an embodiment of the connector of the present invention.

FIG. 7F is a bottom plan view of an embodiment of the connector of the present invention.

FIG. 7G is a front elevation view of a connection formed according to the method of the present invention.

FIG. 7H is a perspective view of an embodiment of the method of the present invention.

FIG. 7I is a perspective view of an embodiment of the method of the present invention.

FIG. 8A is a perspective view of an embodiment of the method of the present invention.

FIG. 8B is a perspective view of an embodiment of the method of the present invention.

FIG. 8C is a perspective view of an embodiment of the method of the present invention.

FIG. 8D is a perspective view of an embodiment of the method of the present invention.

FIG. 8E is a top plan view of an embodiment of the connector of the present invention.

FIG. 8F is a side elevation view of an embodiment of the connector of the present invention.

FIG. 8G is a front elevation view of an embodiment of the connector of the present invention.

FIG. 7H is a bottom plan view of an embodiment of the connector of the present invention.

FIG. 9A is a perspective view of an embodiment of the method of the present invention.

FIG. 9B is a perspective view of an embodiment of the method of the present invention.

FIG. 9C is a perspective view of an embodiment of the method of the present invention.

FIG. 9D is a top plan view of an embodiment of the connector of the present invention.

FIG. 9E is a front elevation view of an embodiment of the connector of the present invention.

FIG. 9F is a side elevation view of an embodiment of the connector of the present invention.

FIG. 9G is a front elevation view of an embodiment of the method of the present invention.

FIG. 9H is a front elevation view of an embodiment of the method of the present invention.

FIG. 9I is a front elevation view of an embodiment of the method of the present invention.

FIG. 10A is a perspective view of an embodiment of the method of the present invention.

FIG. 10B is a perspective view of an embodiment of the method of the present invention.

FIG. 10C is a perspective view of an embodiment of the method of the present invention.

FIG. 10D is a top plan view of an embodiment of the connector of the present invention.

FIG. 10E is a front elevation view of an embodiment of the connector of the present invention.

FIG. 10F is a side elevation view of an embodiment of the connector of the present invention.

FIG. 10G is a front elevation view of an embodiment of the method of the present invention.

FIG. 10H is a front elevation view of an embodiment of the method of the present invention.

FIG. 10I is a front elevation view of an embodiment of the method of the present invention.

FIG. 11A is a perspective view of an embodiment of the method of the present invention.

FIG. 11B is a perspective view of an embodiment of the method of the present invention.

FIG. 11C is a perspective view of an embodiment of the method of the present invention.

FIG. 11D is a perspective view of an embodiment of the method of the present invention.

FIG. 11E is a top plan view of an embodiment of the connector of the present invention.

FIG. 11F is a side elevation view of an embodiment of the connector of the present invention.

FIG. 11G is a front elevation view of an embodiment of the connector of the present invention.

FIG. 11H is a bottom plan view of an embodiment of the connector of the present invention.

FIG. 11I is a side elevation view of an embodiment of the method of the present invention.

FIG. 11J is a side elevation view of an embodiment of the method of the present invention.

FIG. 11K is a side elevation view of an embodiment of the method of the present invention.

FIG. 11L is a side elevation view of an embodiment of the method of the present invention.

FIG. 11M is a side elevation view of an embodiment of the method of the present invention.

FIG. 11N is a side elevation view of an embodiment of the method of the present invention.

FIG. 12A is a perspective view of an embodiment of the driver tool of the present invention.

FIG. 12B is a perspective view of an embodiment of the driver tool of the present invention.

FIG. 12C is a top plan view of an embodiment of the driver tool of the present invention.

FIG. 12D is a side elevation view of an embodiment of the driver tool of the present invention.

FIG. 12E is a cross-sectional view of an embodiment of the driver tool of the present invention.

FIG. 13 is a top plan of the present invention.

FIG. 14A is a top plan view of an embodiment of the connector of the present invention.

FIG. 14B is a front elevation view of an embodiment of the connector of the present invention.

FIG. 15 is a front elevation view of an embodiment of the driver tool and connector of the present invention.

DETAILED DESCRIPTION

As best shown in FIGS. 1A and 1B, the present invention is a method for installing a first supported member 1, having a first substantially planar side 2, a second side 3, a top side 4 and a bottom side 5, of a plurality of generally parallel closely spaced adjoining supported members 6, as best shown in FIG. 13, to a first supporting member 7 of a plurality of supporting members 8 positioned transversely to the plurality of supported members 6.

As best shown in FIGS. 1A and 1B, in the most preferred form of the present invention, the plurality of supported members 6 is wood decking planks and the plurality of supporting members 8 are wood deck joists. As such, the plurality of supported members 6 is horizontally oriented, but the method encompasses any plurality of supported members 6 and any plurality of supporting members 8 in any orientation, although the plurality of supporting members 8 is generally transverse to the plurality of supported members 6. These members can be formed from any material into which the first fasteners 15 and connectors 9 of the present invention can be driven.

As best shown in FIGS. 1A and 1B, initially, the method of the present invention comprises positioning the first supported member 1 across the supporting members 8, so that the bottom side 5 of the first supported member 1 substantially interfaces with the at least two of the plurality of supporting members 8. A minimum of two supporting members 8 is needed to carry the first supported member 1. Then the method of the present invention comprises positioning a first connector 9, best shown in FIGS. 1C–1F, 2C–2F, 3D–3G, 4C–4G, 5D–5H, 6C–6F, 7C–7F, 8E–8H, 9D–9F, 10D–10F, 11E–11H and 14A–14B, having a narrow longitudinal member 10 with a first face 11 and a second face 12, a top 13 and a bottom 14, proximate the first supporting member 7 so that the first face 11 substantially interfaces with the first side 2 of the first supported member 1. The narrow longitudinal member 10 occupies substantially a single plane, as it is designed to fit between narrowly-spaced supported members 6. Then the method of the present invention comprises attaching the first connector 9 to the first side 2 of the first supported member 1 with a first fastener 15. The first fastener 15 is preferably a nail, but any kind of fastener can be used, nail, screw, bolt, brad, staple, or the like. Then the method of the present invention comprises driving, parallel to the plane of the first side 2 of the first supported member 1, the first connector 9 into the first supporting member 7.

As shown in FIGS. 3A–3I, 5A–5H and 8A–8H, in a first preferred embodiment of the present invention, the first connector 9 preferably has a first fastener opening 16 in the longitudinal member 10 and the first fastener 15 is driven through the first fastener opening 16. The first fastener opening 16 of the first connector 9 is preferably a longitudinal slot. The slot can be centered in longitudinal member 10 or it can be offset. The longitudinal member 10 has a top edge 17 at the top 13, a bottom edge 18 at the bottom 14, a first side edge 19 and second side edge 20, and the bottom edge 18 tapers. The bottom edge 18 can taper in equally on either side. It can taper to a point or merely narrow the cross-section of the of the bottom edge 18. This reduces the leading edge cross-section of the first connector 9 and increases the pressure applied to the first supporting member 7 when the first connector 9 is driven, thereby easing driving. Preferably, the first side edge 19 and the second side edge 20 have serrations 52 along at least a portion of their length. This improves the withdrawal resistance of the first connector 9. As shown in FIGS. 11A–11C, 11G and 14B Preferably the longitudinal member 10 has longitudinal corrugations 54. This stiffens the longitudinal member 10 against driving forces. The need to corrugate the longitudinal member 10 is a function of the driving forces and the hardness of the wood into which it is driven. If the wood is relatively soft, the longitudinal member 10 can be formed out of relatively thick sheet metal, 12 gauge steel for example. If the wood is relatively hard, the longitudinal member 10 must be formed from relatively thin sheet metal, 20 or 22 gauge steel in the most preferred form, in order to prevent the first connector 9 from acting as a wedge that splits the first supporting member 7 into which it is driven. When the longitudinal member 10 is formed from very light gauge metal, it may be necessary to longitudinally corrugate the metal in order to stiffen it against driving forces. It may be preferable under certain conditions to form the connector of the present invention from stainless steel, which is both harder and more corrosion resistant than untreated or galvanized steel.

As shown in FIGS. 8A–8H, in a preferred form of the invention, the top edge 17 is integrally joined at a first juncture 21 to a tab 22 that continues in the same plane as the longitudinal member 10.

As shown in FIGS. 3I, 5C and 6B, the first connector 9 of the present invention can be driven until the top 13 is flush with the top side 4 of the first supported member 1. In this case, the first connector 9 can be driven with a hammer 42 or, in fact, any instrument that applies sufficient driving force to the first connector 9. However, as shown in FIGS. 1B, 1G, 2B, 4B, 7B, 7G and 7I it is preferable to drive the first connector 9 until the top 13 is slightly below the top side 4 of the first supported member 1. This hides the top 13 of the first connector 9 from view when subsequent supported members of the plurality of supported members 6 are attached. In the preferred method, a driving tool 43 is interposed between the hammer 42 and the first connector 9. If the first connector 9 is being driven between two closely spaced supported members 6 of the plurality of supported members 6, the driving tool 43 must be sufficiently narrow that it fits between the supported members. It is in any case preferable to use a driving tool 43 because the hammer 42 will leave marks on the top side 4 of the first supported member 1 if nothing is interposed between it and the first connector 9. As shown in FIGS. 8A–8D, the tab 22 of the form described above acts as an integral driving tool 43. When the first connector 9 has been driven into the supporting member 7, one breaks away the tab 22 along the first juncture 21. First juncture 21 eases the breakaway of the tab 22.

As detailed above, the first connector 9 is preferably made of sheet metal. Preferably, the first fastener 15 is a nail.

In another embodiment, the first fastener opening 16 can be a hole. Alternatively, there need not be a first fastener opening 16, and the first fastener 15 is then driven directly through the longitudinal member 10 such that first juncture 21 is below the top side 4 of the first supported member 1. The first connector 9 is then driven into the first supporting member 7 and the tab 22 is then broken away.

As shown in FIGS. 9E and 10E, in another preferred embodiment of present invention, the first fastener opening 16 in the first connector 9 is a round hole. As shown in FIGS. 9A–9C, 9G–9I, 10A–10C and 10G–10I, in this embodiment, the first connector 9 rotates around the first fastener 15 in order to drive the connector 9 into the first supporting member 7. Preferably, the longitudinal member 10 has concentric corrugations 54 centered on the fastener opening 16.

As shown in FIGS. 10A–10I, in one form of this preferred embodiment, the longitudinal member 10 is substantially triangular in profile. Preferably, the first connector 9 is made of sheet metal. Preferably, the first fastener 15 is a nail. As best shown in FIGS. 9A–9I, in another form of this preferred embodiment, the longitudinal member 10 has two wings 23 that extend away from the first fastener opening 16. Preferably, the first connector 9 is made of sheet metal. Preferably, the first fastener 15 is a nail. The form with the triangular profile is stronger than the form with the two wings 23. The primary advantage of these forms, in particular the form with two wings 23, is that they can be accessed from below the structure and rotated back out of the first supporting member 7 if the first supporting member 7 rots. Removing the first supported member 1 when it is attached with the other preferred embodiments of the present invention is more difficult and more destructive.

As shown in FIGS. 1A–1G, 2A–2F, 4A–4G and 7A–7F, in another preferred embodiment of the present invention, the first fastener 15 has a shank 24 and a head 25. The longitudinal member 10 has a first leg 26 and a second leg 27 laterally spaced to accommodate the shank 24 of the first fastener 15 therebetween, and a first connecting portion 28 between the first leg 26 and the second leg 27. And the first leg 26 is driven into the first supporting member 7 until the connecting portion 28 reaches the shank 24. As shown in FIGS. 4A–4G, the second leg 27 can be shorter than the first leg 26. As shown in FIGS. 1A–1G and FIGS. 2A–2F, the second leg 27 is preferably equal in length to the first leg 26 and the second leg 27 is driven into the supporting member 7 alongside the first leg 26. As shown in FIGS. 1A–1G, the first leg 26 and the second leg 27 preferably have serrations 52 along at least a portion of their length. This increases the resistance of the first connector 9 to pullout. Preferably, the first 9 connector is made of sheet metal. As shown in FIG. 14B, preferably, the first leg 26 and the second leg 27 each have a longitudinal reinforcing embossment 53. Preferably, the first fastener 15 is a nail.

As shown in FIGS. 6A and 6B, in another preferred embodiment, the method of the present invention includes driving a second fastener 29 having a shank 30 and a head 31 into the first side 2 of the first supported member 1 such that the head 31 is a selected distance away from the first side 2. The longitudinal member 10 preferably has a third leg 32 laterally spaced from the first leg 26 to closely accommodate the shank 30 of the second fastener 29 therebetween, a second connecting portion 33 between the first leg 26 and the third leg 32, and the second leg 27 and the third leg 32 are laterally spaced to each side of the first leg 26. This gives the first connector 9 a trident-shaped profile. Preferably, the first leg 26 has serrations 52 along at least a portion of its length.

Although in most embodiments the first connector of the present invention is preferably formed from sheet steel, any similarly hard material may be suitable. As shown in FIGS. 7A–7I, in an alternate preferred embodiment, the first connector 9 is bent out of a single piece of wire. In this embodiment, the first fastener 15 is preferably a nail.

As shown in FIGS. 11A–11N, in another preferred embodiment, the longitudinal member 10 has a first leg 26 and a second leg 27 laterally spaced, a first connecting portion 28 between the first leg 26 and the second leg 27, a third leg 32 laterally spaced from the first leg 26, and a second connecting portion 33 between the first leg 26 and the third leg 32. The method additionally comprises positioning a second supported member 34 of the plurality of supported members 6, having a first substantially planar side 35, a second side 36, a top side 37 and a bottom side 38, above the plurality of supporting members 8 on the opposite side of the first connector 9 from the first supported member 1. For ease of installation, the second supported member 34 can be rested on another member before being lowered onto the supporting members 8. One then drives a second fastener 29 between the first leg 26 and the third leg 32 into the second side 36 of the second supported member 34. One then lowers the second supported member 34 to the plurality of supporting members 8. As in all embodiments, the first connector 9 is attached to the first side 2 of the first supported member 1 with a first fastener 15, and the first connector 9 is driven into the first supporting member 7. This embodiment allows a single first connector 9 to attach a first supported member 1 and a second supported member 34 to the first supporting member 7.

As shown in FIG. 11G, in this embodiment, the first leg 26 and the third leg 32 preferably has serrations 52 along at least a portion of their length. Preferably, the first connector 9 is made of sheet metal. Preferably, the second leg 27 and the third leg 32 each have a longitudinal reinforcing embossment 53. Preferably, the first fastener 15 is a nail and the second fastener 29 in a nail.

As shown in FIGS. 7G–7I, in another preferred embodiment, the first fastener 15 has a first leg 39 and a second leg 40 joined by a connecting portion 41. In this embodiment, the first fastener 15 and the first connector 9 are essentially the same and can be identical. This greatly simplifies installation, as no distinction needs to be made between these parts. Preferably, the first connector 9 is bent out of a single piece of wire and the first fastener 15 is bent out of a single piece of wire. The longitudinal member 10 has a first leg 26 and a second leg 27 laterally spaced to accommodate the first leg 39 of the first fastener 15 therebetween, and a first connecting portion 28 between the first leg 26 and the second leg 27. And the first leg 26 is driven into the first supporting member 7 until the connecting portion 28 reaches the first leg 39 of the first fastener 15.

In a preferred embodiment, the first connector 9 is driven by a hammer 42. As shown in FIGS. 1A, 2A, 3C, 4A, 5C, 6A, 7A, 7I, 9I, 10I, 11D and 11N, preferably, a driving tool 43 having an upper portion 44 and a lower portion 45 is interposed between the first connector 9 and the hammer 42 so that the driving force is transferred from the hammer 42 through the driving tool 43 into the first connector 43. The lower portion 44 of the driving tool 43 is dimensioned to fit between the first supported member 1 and a second supported member 34 when the first supported member 1 and the second supported member 34 are closely spaced adjacent and parallel each other. In its most basic form, the driving tool 43 comprises a flat metal rectangle. As shown in FIG. 15, preferably, the lower portion 45 of the driving tool 43 is dimensioned to closely interface with the top 13 of the first connector 9, thereby limiting slip between the two. This close interface can be made by forming the lower portion 45 of the driving tool 43 to conform to the contour of the top 13 of the longitudinal member 10, and it can have a groove or slot formed in the lower portion 45.

As shown in FIGS. 12A–12E, in another preferred embodiment, the driving tool 43 has a body 46, a longitudinal cavity 47 in the body 46 formed to accept the first connector 9 and a sliding force transferring member 48, a lower projection 49 in the lower portion 45, a first arm 50 extending laterally from the lower portion 45, and a second arm 51 extending laterally from the lower portion 45 opposite the first arm 50. Preferably, the first connector 9 is placed inside the longitudinal cavity 47, the driving tool 43 is positioned so that the first arm 50 interfaces with the first supported member 1, the second arm 51 interfaces with the second supported member 34, and the lower projection 49 is substantially between the first supported member 1 and the second supported member 34, the first connector 9 is positioned directly over the first fastener 15. The force transferring member 48 is struck with a hammer 42 until the first connector 9 is driven into the first supporting member 7 and the top 13 of the first connector 9 is below the top side 4 of the first supported member 1 and the top side 37 of the second supported member 34. Preferably, the body 46 is cast in aluminum, and the force transferring member 48 is steel.

In deck construction, the first supported member 1, a deck plank, typically is screwed or toenailed against the ledger board or header, simply because it can be easier than using the connector 9 of the present invention, which may be difficult to install against a ledger board or header. Once the first supported member 1 has been laid down, a first fastener 15 can be driven into the first side 2 of the first supported member 1, or joist, that faces away from the ledger board or header, leaving a gap between the head 25 of the first fastener 15 and the first side 2 of the first supported member 1 large enough to accommodate the thickness of the first connector 9. In the forms that allow it, the first connector 9 can then be slid down over the exposed first fastener 9 shank 24 below the head 25 and driven into the first supporting member 7 below it. The first connector 9 can be driven with a hammer 42 until it is flush with the top side 4 of the first supported member 4, but a narrow driving tool 43, in its simplest form a length of sheet steel, may be needed to drive the first connector 9 down below the top side 4 of the first supported member 7 when two supported members 6 are closely spaced. As shown in FIG. 13, preferably the connectors 9 are staggered on every other of the supporting members 8.

In the most basic form, a second supported member 34 is preferably installed as follows. The second supported member 34, having a first substantially planar side 35, a second side 36, a top side 37, and a bottom side 38, is positioned across the supporting members 8, so that the bottom side 38 of the second supported member 34 substantially interfaces with at least two of the plurality of supporting members 8, and so that the first side 35 is parallel and in close proximity to the second side 3 of the first supported member 1. Because it is in close proximity, the gap between the first supported member 1 and the second supported member 34 is relatively narrow, permitting and, moreover, encouraging the use of the method of the present invention and the narrow connector 9 of the present invention, which are particularly well-adapted for such installations. A second connector 9, having a narrow longitudinal member 10 with a first face 11 and a second face 12, a top 13 and a bottom 14, is positioned proximate the first supporting member 7 so that the first face 11 substantially interfaces with the first side 35 of the second supported member 34. The second connector 9 is attached to the first side 35 of the second supported member 34 with a first fastener 15 and the first connector 9 is driven, parallel to the plane of the first side 35 of the second supported member 34, into the first supporting member 7.

If the supporting members 8 are wide enough, connectors 9 can be placed side-by-side, attaching facing supported member 6. The standard joist is 6×2 or 8×2, so there usually isn't enough room for side-by-side installations. The gap between the boards is set according to preference. Green wood is usually closely spaced because it will shrink and widen the gap. Some prefer a wider gap in order to allow debris to be swept through the gaps.

In the preferred form, the second side 3 of the first supported member 1 is preferably connected as follows. After connecting the first side 2, one positions a second connector 9, having a narrow longitudinal member 10 with a first face 11 and a second face 12, a top 13 and a bottom 14, proximate one of the plurality of supporting members 8 so that the first face 11 substantially interfaces with the second side 3 of the first supported member 1. One then attaches the connector 9 to the second side 3 of the first supported member 1 with a first fastener 15. Finally, one drives, parallel to the plane of the second side 3 of the first supported member 1, the connector 9 into the proximate one of the plurality of supporting members 8.

Since the supported member 1 is already attached to the supporting member 7 when this connector 9 on the second side 3 is driven in, the embodiment used here must be able to slide past the second side 3 of the supported member 1 while it is being driven into the supporting member 7.

A second supported member 34 can then be installed. The second supported member 34, having a first substantially planar side 35, a second side 36, a top side 37, and a bottom side 38, is positioned across the supporting members 8, so that the bottom side 38 of the second supported member 34 substantially interfaces with at least two of the plurality of supporting members 8, and so that the first side 35 is parallel and in close proximity to the second side 2 of the first supported member 1. Because it is in close proximity, the gap between the first supported member 1 and the second supported member 34 is relatively narrow, permitting and, moreover, encouraging the use of the method of the present invention and the narrow connector 1 of the present invention, which are particularly well-adapted for such installations. A second connector 9, having a narrow longitudinal member 10 with a first face 11 and a second face 12, a top 13 and a bottom 14, is positioned proximate one of the plurality of supporting members 8 so that the first face 11 substantially interfaces with the first side 35 of the second supported member 34. The second connector 9 is attached to the first side 35 of the second supported member 34 with a first fastener 15 and the first connector 9 is driven, parallel to the plane of the first side 35 of the second supported member 34, into the proximate one of the plurality of supporting members 8.

In order to connect both sides of the second supported member 34, after connecting the first side 35, one positions another connector 9, having a narrow longitudinal member 10 with a first face 11 and a second face 12, a top 13 and a bottom 14, proximate one of the plurality of supporting members 8 so that the first face 11 substantially interfaces with the second side 36 of the second supported member 34. One then attaches the connector 9 to the second side 36 of the second supported member 34 with a first fastener 15. Finally, one drives, parallel to the plane of the second side 36 of the second supported member 34, the connector 9 into the proximate one of the plurality of supporting members 8.

We claim:

1. A method for installing a first supported member (1), having a first substantially planar side (2), a second side (3), a top side (4) and a bottom side (5), of a plurality of generally parallel closely spaced adjoining supported members (6), to a first supporting member (7) of a plurality of supporting members (8) positioned transversely to said plurality of supported members (6) comprising steps of:
   a. positioning said first supported member (1) across said supporting members (8), so that said bottom side (5) of said first supported member (1) substantially interfaces with at least two of said plurality of supporting members (8);
   b. positioning a first connector (9), having a narrow longitudinal member (10) with a first face (11) and a second face (12), a top (13) and a bottom (14), proximate said first supporting member (7) so that said first face (11) substantially interfaces with said first side (2) of said first supported member (1);
   c. attaching said first connector (9) to said first side (2) of said first supported member (1) with a first fastener (15); and
   d. driving, parallel to the plane of said first side (2) of said first supported member (1), said first connector (9) into said first supporting member (7) and embedding a portion of said first face (11) in said first supporting member (7).

2. The method of claim 1 wherein:
   a. said first connector (9) has a first fastener opening (16) in said longitudinal member (10) and said first fastener (15) is driven through said first fastener opening (16).

3. The method of claim 2 wherein:
   a. said first fastener opening (16) of said first connector (9) is a longitudinal slot.

4. The method of claim 3 wherein:
   a. said longitudinal member (10) has a top edge (17) at said top (13), a bottom edge (18) at said bottom (14), a first side edge (19) and second side edge (20), and said bottom edge (18) tapers.

5. The method of claim 4 wherein:
   a. said first side edge (19) and said second side edge (20) have serrations (52) along at least a portion of their length.

6. The method of claim 5 wherein:
   a. said longitudinal member (10) has longitudinal corrugations (54).

7. The method of claim 6 wherein:
   a. said top edge (17) is integrally joined at a first juncture (21) to a tab (22) that continues in the same plane as said longitudinal member (10).

8. The method of claim 7 additionally comprising:
   a. breaking away said tab (22) along said first juncture (21).

9. The method of claim 8 wherein:
   a. said first connector (9) is made of sheet metal.

10. The method of claim 9 wherein:
    a. said first fastener (15) is a nail.

11. The method of claim 1 wherein:
    a. said first fastener (15) has a shank (24) and a head (25).
    b. said longitudinal member (10) has a first leg (26) and a second leg (27) laterally spaced from said first leg (26) to accommodate said shank (24) of said first fastener (15) therebetween, and a first connecting portion (28) between said first leg (26) and said second leg (27); and
    c. said first leg (26) is driven into said first supporting member (7) until said connecting portion (28) reaches said shank (24).

12. The method of claim 11 wherein said second leg (27) is equal in length to said first leg (26) and said second leg (27) is driven into said supporting member (7) alongside said first leg (26).

13. The method of claim 12 wherein:
    a. said first leg (26) and said second leg (27) have serrations (52) along at least a portion of their length.

14. The method of claim 13 wherein:
    a. said first (9) connector is made of sheet metal.

15. The method of claim 14 wherein:
    a. said first leg (26) and said second leg (27) each have a longitudinal reinforcing embossment (53).

16. The method of claim 15 wherein:
    a. said first fastener (15) is a nail.

17. The method of claim 11 wherein said method additionally comprises:
    a. driving a second fastener (29) having a shank (30) and a head (31) into said first side (2) of said first supported member (1) such that said head (31) is a selected distance away from said first side (2).

18. The method of claim 17 wherein:
    a. said longitudinal member (10) has a third leg (32) laterally spaced from said first leg (26) to closely accommodate said shank (30) of said second fastener (29) therebetween, a second connecting portion (33) between said first leg (26) and said third leg (32), and said second leg (27) and said third leg (32) are laterally spaced to each side of said first leg (26).

19. The method of claim 18 wherein:
    a. said first leg (26) have serrations (52) along at least a portion of its length.

20. The method of claim 11 wherein:
    a. said first connector (9) is bent out of a single piece of wire.

21. The method of claim 20 wherein:
    a. said first fastener is a nail.

22. The method of claim 1 wherein said longitudinal member (10) has a first leg (26) and a second leg (27) laterally spaced, a first connecting portion (28) between said first leg (26) and said second leg (27), a third leg (32) laterally spaced from said first leg (26), and a second connecting portion (33) between said first leg (26) and said third leg (32) and said method additionally comprises:
    a. positioning a second supported member (34) of the plurality of supported members (6), having a first substantially planar side (35), a second side (36), a top side (37) and a bottom side (38), on said plurality of supporting members (8) on the opposite side of said first connector (9) from said first supported member (1);
    b. driving a second fastener (29) between said first leg (26) and said third leg (32) into said second side (36) of said second supported member (34); and c. lowering said second supported member (34) to said plurality of supporting members (8).

23. The method of claim 22 wherein said second leg (27) and said third leg (32) have serrations (52) along at least a portion of their length.

24. The method of claim 23 wherein said first connector (9) is made of sheet metal.

25. The method of claim 24 wherein said second leg (27) and said third leg (32) each have a longitudinal reinforcing embossment (53).

26. The method of claim 25 wherein said first fastener (15) is a nail and said second fastener (29) in a nail.

27. The method of claim 1 wherein:
  a. said first fastener (15) has a first leg (39) and a second leg (40) joined by a connecting portion (41);
  b. said longitudinal member (10) has a first leg (26) and a second leg (27) laterally spaced to accommodate said first leg (39) of said first fastener (15) therebetween, and a first connecting portion (28) between said first leg (26) and said second leg (27); and
  c. said first leg (26) is driven into said first supporting member (7) until said connecting portion (28) reaches said first leg (39) of said first fastener (15).

28. The method of claim 27 wherein:
  a. said first connector (9) is bent out of a single piece of wire; and
  b. said first fastener (15) is bent out of a single piece of wire.

29. The method of claim 1 wherein said first connector (9) is driven by a hammer (42).

30. The method of claim 29 wherein:
  a. a driving tool (43) having a upper portion (44) and a lower portion (45) is interposed between said first connector (9) and said hammer (42) so that the driving force is transferred from said hammer (42) through said driving tool (43) into said first connector (43); and
  b. said lower portion (44) of said driving tool (43) is dimensioned to fit between said first supported member (1) and a second supported member (34) when said first supported member (1) and said second supported member (34) are closely spaced adjacent and parallel each other.

31. The method of claim 30 wherein said driving tool comprises a flat metal rectangle.

32. The method of claim 31 wherein said lower portion (45) of said driving tool (43) is dimensioned to closely interface with said top (13) of said first connector (9), thereby limiting slip between the two.

33. The method of claim 32 wherein said driving tool (43) has a body (46), a longitudinal cavity (47) in said body (46) formed to accept said first connector (9) and a sliding force transferring member (48), a lower projection (49) in said lower portion (45), a first arm (50) extending laterally from said lower portion (45), and a second arm (51) extending laterally from said lower portion (45) opposite said first arm (50).

34. The method of claim 33 wherein:
  a. said first connector (9) is placed inside said longitudinal cavity (47), said driving tool (43) is positioned so that said first arm (50) interfaces with said first supported member (1), said second arm (51) interfaces with said second supported member (34), and said lower projection (49) is substantially between said first supported member (1) and said second supported member (34), said first connector (9) is positioned directly over said first fastener (15); and
  b. said force transferring member (48) is struck with a hammer (42) until said first connector (9) is driven into said first supporting member (7) and said top (13) of said first connector (9) is below said top side (4) of said first supported member (1) and said top side (37) of said second supported member (34).

35. The method of claim 1 further comprising:
  a. positioning a second supported member (34), having a first substantially planar side (35), a second side (36), a top side (37), and a bottom side (38), across said supporting members (8), so that said bottom side (38) of said second supported member (34) substantially interfaces with at least two of said plurality of supporting members (8), and so that said first side (35) is parallel and in close proximity to said second side (3) of said first supported member (1);
  b. positioning a second connector (9), having a narrow longitudinal member (10) with a first face (11) and a second face (12), a top (13) and a bottom (14), proximate said first supporting member (7) so that said first face (11) substantially interfaces with said first side (35) of said second supported member (34);
  c. attaching said second connector (9) to said first side (35) of said second supported member (34) with a first fastener (15); and
  d. driving, parallel to the plane of said first side (35) of said second supported member (34), said first connector (9) into said first supporting member (7).

36. The method of claim 1 further comprising:
  a. positioning a second connector (9), having a narrow longitudinal member (10) with a first face (11) and a second face (12), a top (13) and a bottom (14), proximate one of said plurality of supporting members (8) so that said first face (11) substantially interfaces with said second side (3) of said first supported member (1);
  b. attaching said second connector (9) to said second side (3) of said first supported member (1) with a first fastener (15); and
  c. driving, parallel to the plane of said second side (3) of said first supported member (1), said first connector (9) into said proximate one of said plurality of supporting members (8).

* * * * *